(12) United States Patent
Yourlo

(10) Patent No.: US 6,201,176 B1
(45) Date of Patent: Mar. 13, 2001

(54) SYSTEM AND METHOD FOR QUERYING A MUSIC DATABASE

(75) Inventor: Zhenya Yourlo, Roseville (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/295,093

(22) Filed: Apr. 21, 1999

(30) Foreign Application Priority Data

| May 7, 1998 | (AU) | PP3405 |
| May 7, 1998 | (AU) | PP3408 |
| May 7, 1998 | (AU) | PP3410 |

(51) Int. Cl.$^7$ ............ G10H 7/00; G10H 1/18; G10H 1/26; G10H 5/00

(52) U.S. Cl. ............ 84/609; 84/615; 84/649; 84/653; 434/307 A

(58) Field of Search ............ 84/600–603, 608–612, 84/615–618, 622–623, 634–636, 649–656, 666–668, 477 R; 434/307 A

(56) References Cited

U.S. PATENT DOCUMENTS

| 5,250,745 | * | 10/1993 | Tsumura | 84/603 |
| 5,393,927 | * | 2/1995 | Aoki | 84/634 |
| 5,519,166 | * | 5/1996 | Furuhashi et al. | 84/603 |
| 5,536,902 | * | 7/1996 | Serra et al. | 84/623 |
| 5,616,876 | | 4/1997 | Cluts | 84/609 |
| 5,756,915 | * | 5/1998 | Matsuda | 84/602 |
| 5,986,199 | * | 11/1999 | Peevers | 84/603 |

OTHER PUBLICATIONS

The Journal of the Acoustical Society of America; Eric D. Scheirer; "Tempo and Beat Analysis of Acoustic Musical Signals"; vol. 103, No. 1, Jan. 1998; pp. 588–601.

Thom Blum et al., "Audio Analysis for Content–Based Retrieval", Muscle Fish, May 3, 1996.

Eric D. Scheirer, "Tempo and beat analysis of acoustic musical signals", Acoustical Society of America, vol. 103, pp. 601, 1998.

* cited by examiner

*Primary Examiner*—Robert E. Nappi
*Assistant Examiner*—Marlon T. Fletcher
(74) *Attorney, Agent, or Firm*—Fitzpatrick, Cella, Harper & Scinto

(57) ABSTRACT

A system and method for querying a music database, the database containing a plurality of indexed pieces of music, where the query is performed by forming a database request consisting of a conditional expression relating to the name and/or attributes of the desired piece of music. Associated features are derived from the database query, and compared with corresponding features for the other pieces of music in the database. A desired piece of music is determined by searching for a minimum distance between the database query features and those associated with the pieces of music in the database.

55 Claims, 19 Drawing Sheets

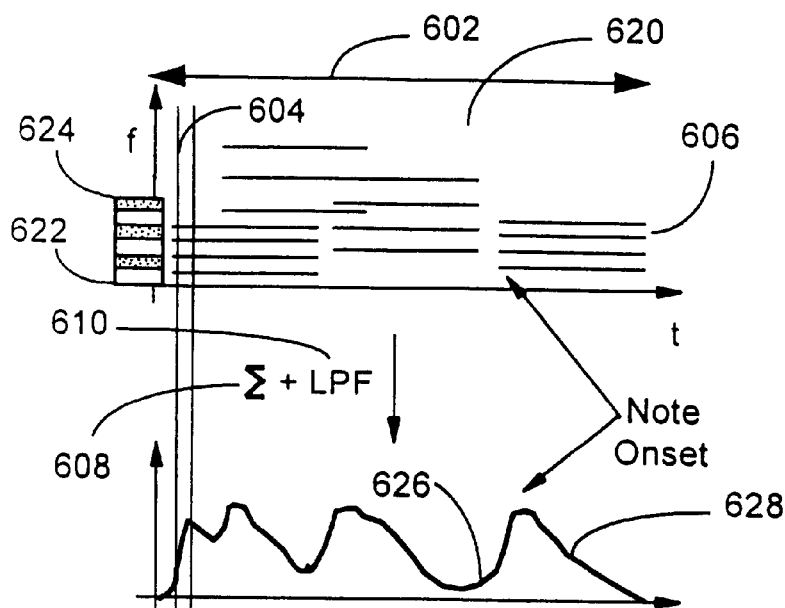
Fig. 6A
Fig. 6B
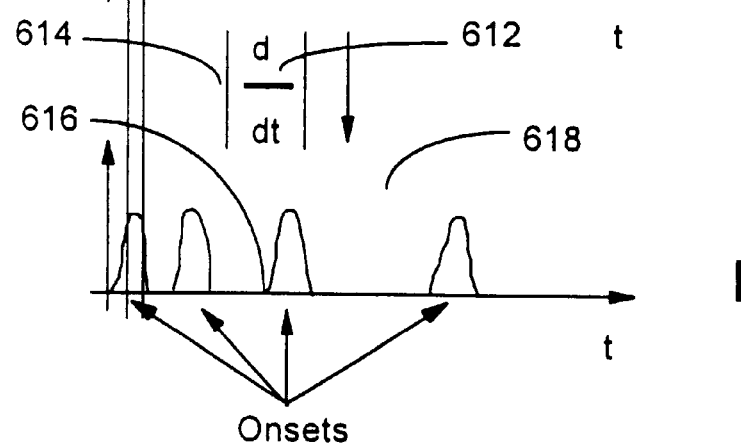
Fig. 6C

SYSTEM AND METHOD FOR QUERYING A MUSIC DATABASE

FIELD OF THE INVENTION

The present invention relates to the field of music systems and, in particular, to the identification and retrieval of particular pieces of music or alternately, attributes of a desired piece of music, from a music database on the basis of a query composed of desired features and conditional statements.

BACKGROUND OF THE INVENTION

Retrieval of music or music attributes from a database requires, in common with generic database functionality, a query method which is powerful and flexible, and preferably intuitively meaningful to the user. This in turn requires that the database contain music which has been classified in a manner which is conducive to systematic search and sort procedures. This latter aspect in turn requires that pieces of music be characterized in a manner which permits of such classification.

Thus a hierarchy of requirements or elements which make up a music database system are as follows:
  characterizing music using attributes useful in a classification scheme,
  classifying music in a meaningful searchable structure, and
  querying the database so formed, to yield meaningful results.

The hierarchy has been defined "bottom up" since this presents a more meaningful progression by which the invention can be described.

When considering audio signals in general, and in particular those relating to music, the nature of the signals may be considered in terms of various attributes which are intuitively meaningful. These attributes include, among others, tempo, loudness, pitch and timbre. Timbre can be considered to be made up of a number of constituent sub-features including "sharpness" and "percussivity". These features can be extracted from music and are useful in characterizing the music for a classification scheme.

The publication entitled "Using Bandpass and Comb Filters to Beat-track Digital Audio" by Eric D. Scheirer (MIT Media Laboratory, Dec. 20, 1996) discloses a method for extraction of rhythm information or "beat track" from digital audio representing music. An "amplitude-modulated noise" signal is produced by processing a musical signal through a filter bank of bandpass filters. A similar operation is also performed on a white noise signal from a pseudo-random generator. Subsequently the amplitude of each band of the noise signal is modulated with the amplitude envelope of the corresponding band of the musical filter bank output. Finally the resulting amplitude modulated noise signals are summed together to form an output signal. It is claimed that the resulting noise signal has a rhythmic percept which is significantly the same as that of the original music signal. The method described can run in real-time on a very fast desktop workstation or alternately, a multiprocessor architecture may be utilized. This method suffers from the disadvantage of being highly computationally intensive.

Percussivity is that attribute which relates to a family of musical instruments known as "percussion" when considering an orchestra or a band. This family includes such musical instruments as drums, cymbals, castanets and others. Processing of audio signals in general and musical signals in particular, benefits from the ability to estimate various attributes of the signals, and the present invention is concerned with estimating the attribute of percussivity.

A number of different methods have been used to estimate percussivity of a given signal, such methods including those broadly based upon:
  short-time power analysis,
  statistical analysis of signal amplitude, and
  comparison of harmonic spectral component power with total spectral power.

Short-time signal power estimation involves calculation of an equivalent power (or an approximation thereof) within a short segment or "window" of a signal under consideration. The power estimate can be compared to a threshold in order to determine whether the portion of the signal within the window is percussive in nature. Alternatively, the power estimate can be compared to a sliding scale of thresholds, and the percussive content of the signal classified with reference to the range of thresholds.

Statistical analysis of signal amplitude is typically based upon a "running mean" or average signal amplitude value, where the mean is determined for a window which slides across the signal under consideration. By sliding the window, the running mean is determined over a predetermined time period of interest. The mean value at each window position is compared to mean values for other windows in a neighborhood in order to determine whether signal variations in the running mean are sufficiently large to signify that the signal is percussive.

Harmonic spectral component power analysis involves taking a windowed Fourier transform of the signal in question over the time period of interest, and then examining the resulting set of spectral components. The spectral components which are indicative of harmonic series are removed. It is noted that such harmonic series components typically represent local maxima in the overall spectral envelope of the signal. After removing the harmonic series spectral components, remaining spectral components substantially consist only of the inharmonic components of the signal, these being considered to represent percussive components of the signal. The total power in these inharmonic components is determined and compared with a total signal power for all components, harmonic and non-harmonic, to yield an indication of percussivity.

The aforementioned analysis methods are typically intended to identify a range of signal attributes, and thus suffer from relatively limited accuracy, and a tendency to produce false or unreliable percussivity estimates. The methods are also relatively complex and thus expensive to implement, particularly the harmonic spectral component estimation method.

U.S. Pat. No. 5,616,876 (Cluts et al) entitled "System and Methods for Selecting Music on the Basis of Subjective Content" describes an interactive network providing music to subscribers which allows a subscriber to use a seed song to identify other songs similar to the seed song, the similarity between songs being based on the subjective content of the songs, as reflected in style tables prepared by editors. The system and methods described in this publication are based on the manual categorization of music, with the attendant requirement for human participation in the process, with the resultant speed, accuracy and repeatability of the process limited by human attributes.

The publication entitled "Content-Based Classification, Search, and Retrieval of Audio" by Erling ct al (IEEE Multimedia Vol. 3, No. 3, 1996, pp. 27–36) discloses indexing and retrieving short audio files (i.e. "sounds") from a database. Features from the sound in question are extracted, and feature vectors based on statistical measures relating to the features are generated. Both the sound and the set of feature vectors are stored in a database for later search and retrieval. A method of feature comparison is used to determine whether or not a selected sound is similar to another sound stored in the database. The feature set selected does not include tempo and thus the system will not perform well in differentiating between pieces of music. Furthermore, the method determines features which provide scalar statistical measures over short time windows. Furthermore, the method uses features such as bandwidth which are not readily conceptualized in terms of impact of music selection.

It is seen from the above that existing arrangements have shortcomings in all elements in the hierarchy of requirements described, and it is an object of the invention to ameliorate one or more disadvantages of the prior art.

SUMMARY OF THE INVENTION

According to one aspect of the invention, there is provided a method for querying a music database, which contains a plurality of pieces of music. The method involves classifying the pieces of the music in the database, using feature extraction. The classification involves segmenting each piece of music into a plurality of windows, extracting at least one characteristic feature in each of the windows, and indexing each piece of music as a function of the extracted features. A request is formed which specifies either a name of a piece of music, or features characterising the piece of music. The request also forms at least one conditional expression. The method compares the features characterising the specified piece of music to corresponding features characterising other pieces of music in the database, and calculates, using the aforementioned comparisons, corresponding distances between the specified piece of music and the other pieces of music in the database. The method identifies pieces of music in the database which are at distances from the specified piece of music which satisfy the at least one conditional expression.

BRIEF DESCRIPTION OF THE DRAWINGS

A preferred embodiment of the present invention will be described in detail with reference to the accompanying drawings in which:

FIG. 6 presents a further illustration of the tempo feature extraction process;

DETAILED DESCRIPTION

Figure 1:
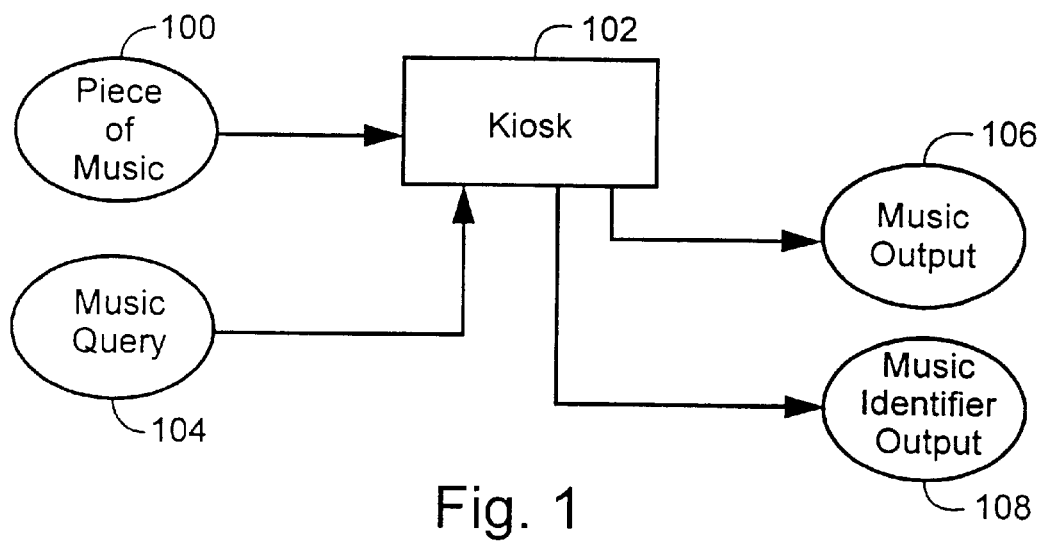
FIG. 1 depicts a music database system in a kiosk embodiment.

FIG. 1 depicts a music database system in a kiosk 102 embodiment. For the purpose of the description it is noted that "kiosk" is a term of art denoting a public access data terminal for use in, for example, information data retrieval and audio output receipt. In this embodiment, the owner/operator of the kiosk 102 inputs pieces of music 100 into the kiosk 102 where they are classified and stored in a database for future retrieval. A music lover comes up to the kiosk and inputs a music query 104 to the kiosk 102, which after performing a search of the kiosk music database based on parameters in the music query 104, outputs a desired piece of music 106 which is based on the music query 104. The kiosk 102 also outputs music identifiers 108 associated with the desired piece of music 106. Such identifiers could include, for example, the name of the piece of music.

Figure 2:
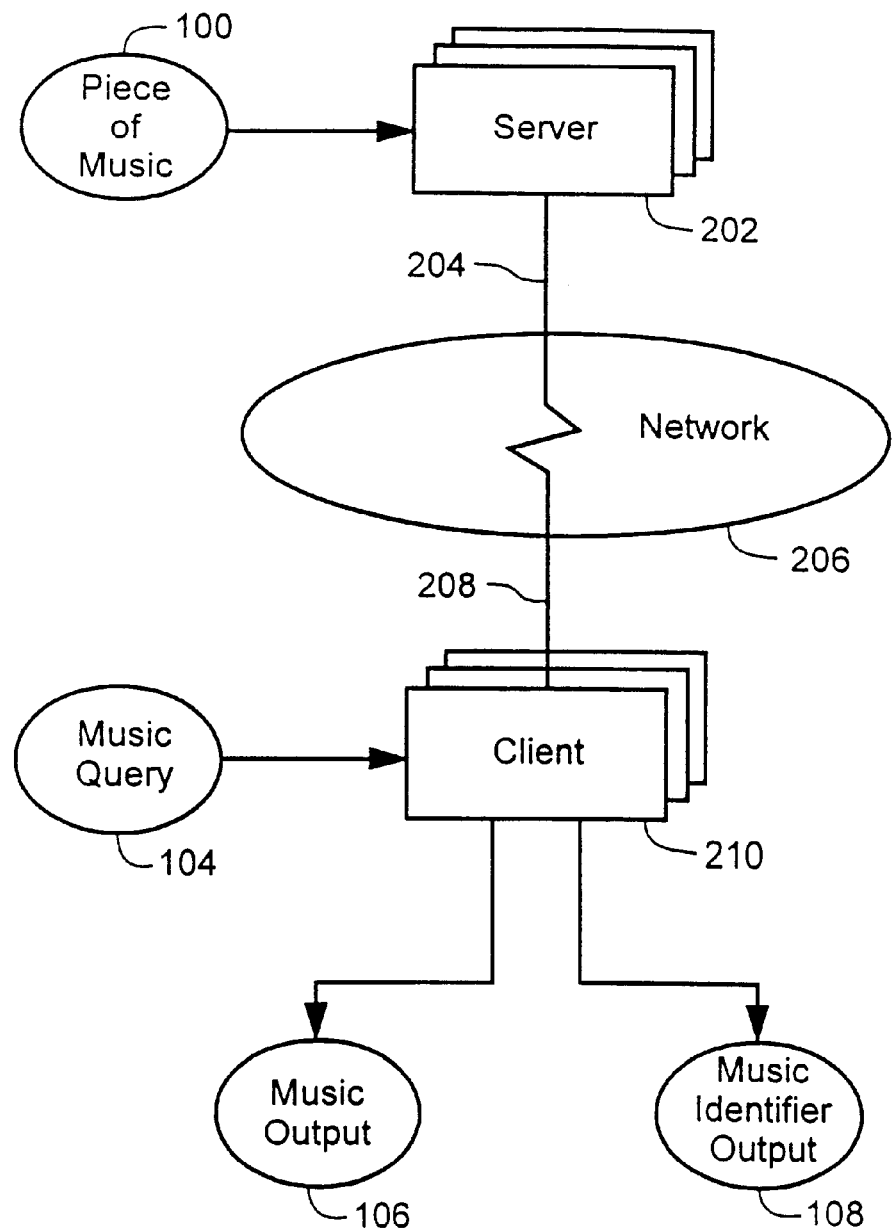
FIG. 2 illustrates a music database system in a network embodiment.

FIG. 2 illustrates a music database system in a network embodiment. In this embodiment, a plurality of music database servers 202 are connected to a network 206 via access lines 204. The owner/operators of the servers 202 input pieces of music 100 into the servers 202 where they are classified and stored in the database for future retrieval. Servers may be embodied in various forms including by means of general purpose computers as described in FIG. 22 below. A plurality of music database clients 210 are also connected to the network 206 via access lines 208. An owner of a client inputs a music query 104 into a client 210, which establishes a connection to the music database server 202 via a network connection comprising access line 208, network 206 and access line 204. The server 202 performs a search of the music database based upon user query 104, and then outputs a desired piece of music 106, which is based on the music query 104, across the same network connection 204–206–208. The server 202 also outputs music identifiers 108 associated with the desired piece of music 106. Such identifiers could include, for example, the name of the piece of music.

Figure 3:
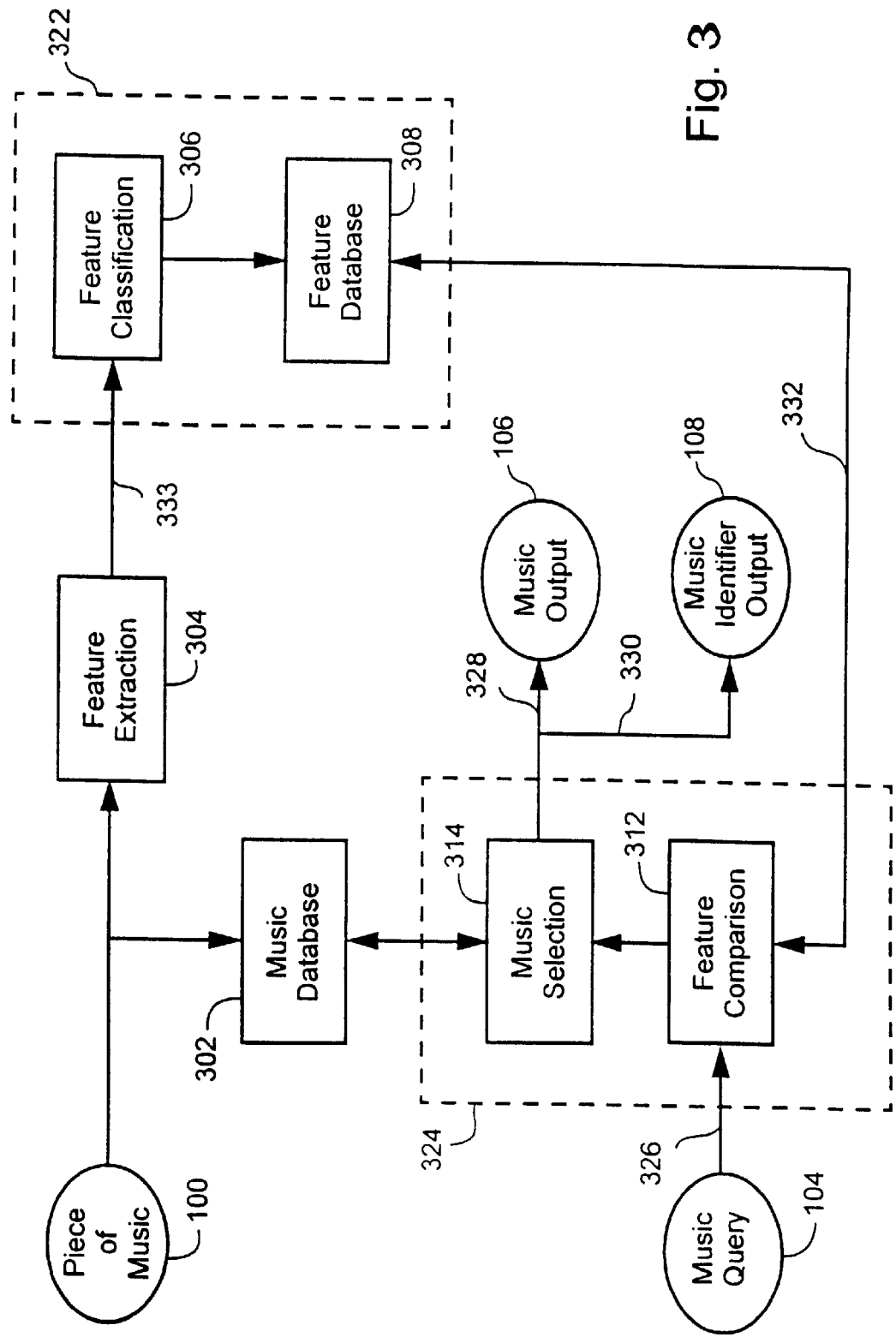
FIG. 3 provides a functional description of a music database system.

FIG. 3 provides a functional description of the music database system. The database system performs two high level processes, namely (i) inputting pieces of music 100, classifying them and storing them in the database for later search and retrieval and (ii) servicing queries 104 to the music database system consequent upon which it outputs a desired piece of music 106 and/or music identifiers 108 associated with the desired piece of music 106. Such identifiers could include, for example, the name of the piece of music. Considering first the music input and classification process, a piece of music 100 is input, and it then undergoes a feature extraction step 304 after which the features undergo a classification step 306 and are stored in a feature database 308. In parallel with this process, the actual music piece itself 100 is stored in a music database 302. Thus the piece of music 100 and its associated representative features are stored in two databases 302 and 308 respectively. Next considering the database query process, the user query 104 is input whereupon a feature comparison step 312 is performed between the features associated with the user query 104 and the features of the pieces of music stored in the feature database 308. After a successful search, a music selection process 314 extracts the desired piece of music 106 from the music database 302 on the basis of the feature comparison step 312, and the music selection step 314 outputs the desired piece of music 106 and/or the music identifiers 108 associated with the desired piece of music 106.

Figure 4:
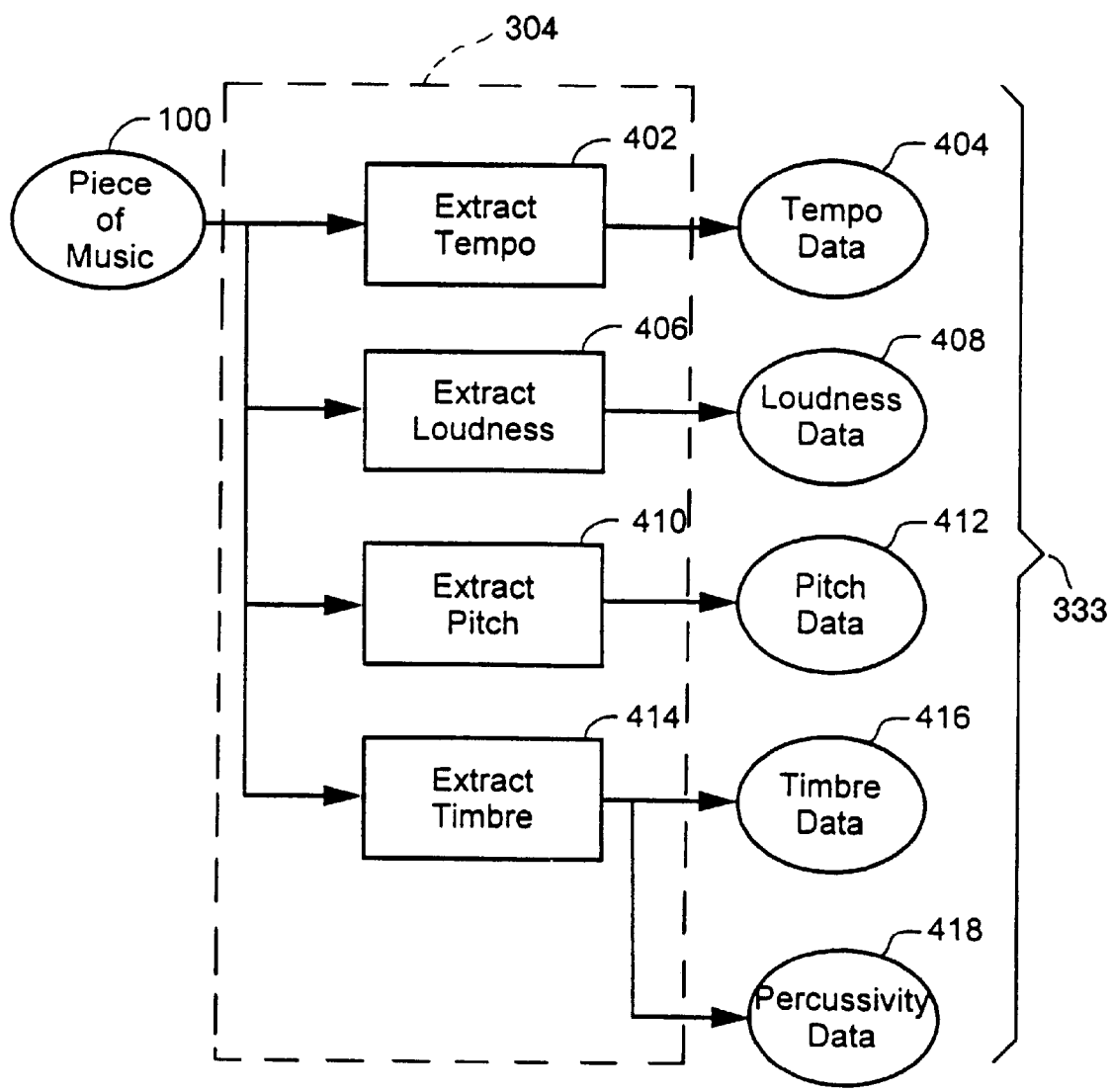
FIG. 4 illustrates a generic feature extraction process.

FIG. 4 depicts a generic feature extraction process. Recalling from the functional description of the database system in FIG. 3, the piece of music 100 is input, it then undergoes feature extraction in the step 304 after which the features are classified in the step 306 and stored in the feature database 308. In FIG. 4, the piece of music 100 is input, and the feature extraction process 304 is seen to include, in this illustration, four parallel processes, one for each feature. The tempo extraction process 402 operates upon the input piece of music 100 to produce tempo data output 404. The loudness extraction process 406 operates upon the input piece of music 100 to produce loudness data output 408. The pitch extraction process 410 operates upon the input piece of music 100 to produce pitch data output 412. The timbre extraction process 414 operates upon the input piece of music 100 to produce sharpness data output 416 and percussivity data output 418. The five sets of feature data namely the tempo data 404, the loudness data 408, the pitch data 412, the sharpness data 416, and the percussivity data 418 constitute the data carried by a connection 333 from the feature extraction process 304 to the feature classification process 306 (see FIG. 3). Thus, referring again to FIG. 3 it is seen that for this example, the line 332 between the feature comparison process 312 and the feature database 308 is handling five different data sets 404, 408, 412, 416, and 418.

Figure 5:
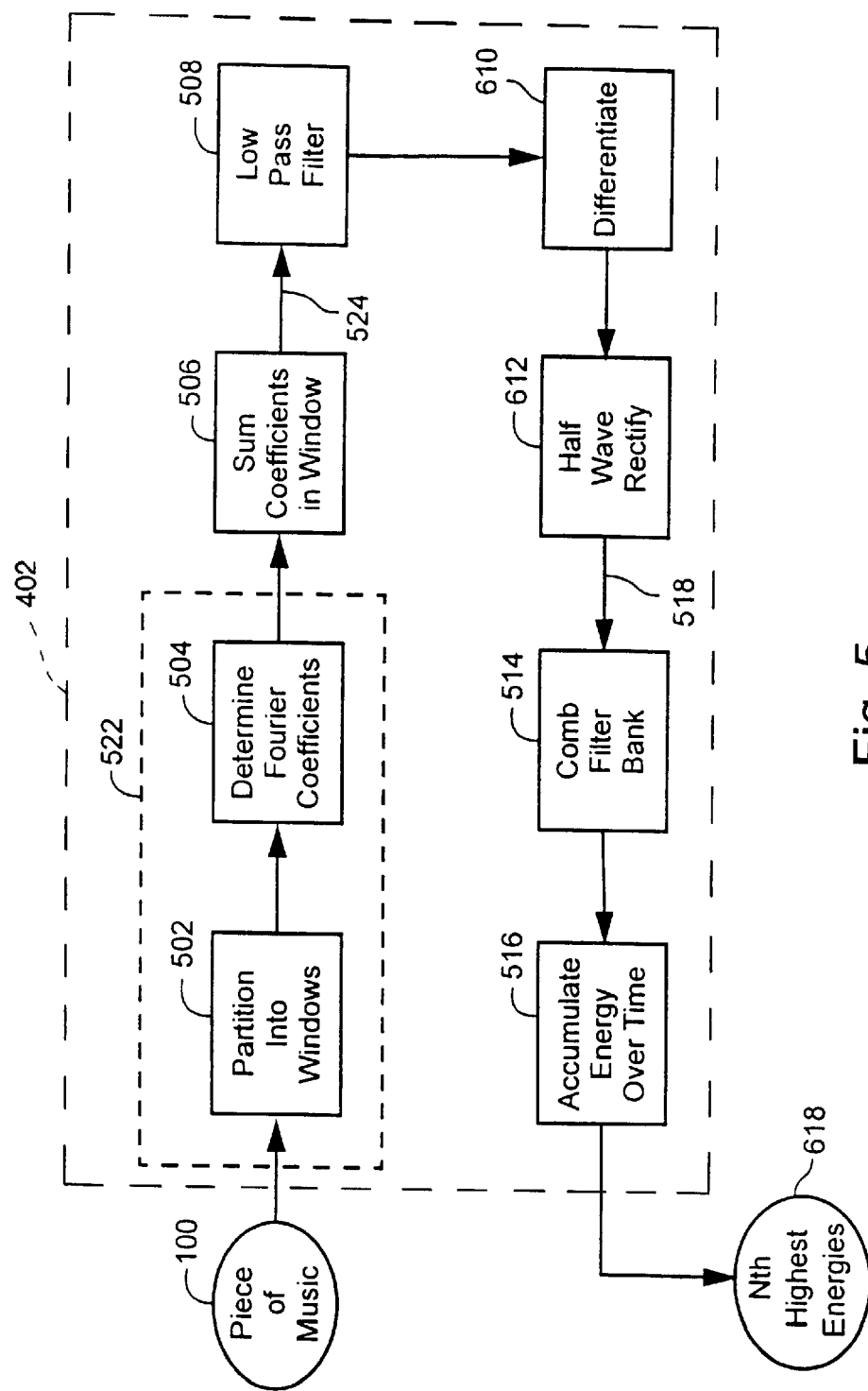
FIG. 5 depicts the tempo feature extraction process.

FIG. 5 shows the tempo feature extraction process 402 (described in FIG. 4) which will be described in some detail. Tempo extraction firstly involves determination of the signal 620 (see FIG. 6) from the piece of music 100, and then involves filtering this output signal through a bank of comb filters. Finally the energy in the comb filters, accumulated over substantially the entire duration 602 of the piece of music, 100 provides the raw tempo data 404 (see FIG. 4) indicative of the tempo or tempi (various tempos) present in the piece of music 100 substantially over its duration 602. This set of processes is preferably implemented in software. Alternatively, a number of processes and sub-processes can, if desired, be performed, for example, on the audio input card 2216 (see FIG. 22), where say a Fast Fourier Transform (FFT) can be performed using a Digital Signal Processor (DSP). Furthermore, comb filters, described in relation to feature extraction, can also be implemented using a DSP on the audio card 2216. Alternatively, these processes can be performed by the general purpose processor 2204. In FIG. 5, an input music signal 100 is partitioned into windows in a process 502, and the Fourier coefficients in each window are determined in a process 504. These two processes 502 and 504 together form an expanded view of a Fast Fourier Transform process 522. After calculating the FFT, the coefficients in each window are summed in a process 506 and the resulting signal, output on a connection 524 from the process 506, is low pass filtered in a process 508, then differentiated in a process 510, and then half wave rectified in a process 512 to produce an onset signal 618 (see FIG. 6).

Turning to FIG. 6, a waveform representation of the process described in FIG. 5 is shown. After windowing the input music signal 100, the signal in each time window 604 is processed by a Fast Fourier Transform (FFT) process to form an output signal 620 which is shown pictorially as frequency components 606 in frequency bins 622–624 which are divided into individual time windows 604. The output signal 620 then has its frequency components 606 in the various frequency bins 622–624 added by an addition process 608. This summed signal, which may be considered as an energy signal, has positive polarity and is passed through a low pass filter process 610, whose output signal 628 is differentiated 612 to detect peaks, and then half-wave rectified 614 to remove negative peaks, finally producing onset signal 618. The music signal is processed across substantially the full duration of the piece of music 100. In an alternate embodiment, the onset signal 618 could be derived by sampling the signal 628 (which is output from the low pass filter 610), after the signal 628 is differentiated 612 and half-wave-rectified 614, comparing consecutive samples to detect positive peaks of the signal, and generating pulses each time such a peak is detected. A brief explanation about the effect of partitioning the signal into time windows is in order. Summing frequency component amplitudes in each window is a form of decimation (i.e. reduction of the sampling frequency), since the number of digitized music samples in a window are summed to form one resultant point. Thus selection of the window size has the effect of reducing the number of sample points. The optimum selection of window size requires a balance between the accuracy of the resultant representation of the feature, and compression of the data in order to reduce computational burden. The inventor has found that a 256 point FFT (equivalent to an 11.6 msec music window size) yields good performance when using the resultant feature for comparing and selecting music pieces in regard to tempo. Once significant changes in the spectrum (i.e. the starting points of notes 616) are located, the onset signal 618 is passed through a bank of comb filters in a process 514 (see FIG. 5) in order to determine the tempo. As noted previously, comb filters can be implemented using DSPs on the audio card 2216, or alternatively, by using the general purpose processor 2204 (see FIG. 22). Each comb filter has a transfer function of the form:

$$y_t = \alpha y_{t-\tau} + (1-\alpha)x_t$$

where: $y_t$ represents the instantaneous comb filter output,
$y_{t-\tau}$ represents a time delayed version of the comb filter output, and
$x_t$ represents the onset signal (618).

Each of these comb filters has a resonant frequency (at which the output is reinforced) determined by the parameter $1/\tau$. The parameter $\alpha$ (alpha) corresponds to the amount of weighting placed on previous inputs relative to the amount of weighting placed on current and future inputs. The onset signal 618 is filtered through the bank of comb filters in the process 514, the comb filter resonant frequencies being placed at frequencies which are at multiple sample spacings resulting from windowing. The filters should typically cover the range from about 0.1 Hz through to about 8 Hz. The filter with the highest energy output at each sample point is considered to have "won", and a tally of wins is maintained in the process 516, for each filter in the filterbank, for example by using a power comparator to determine the highest energy and a counter to tally the "wins". After the onset signal 618 over substantially the full duration 602 of the piece of music 100 has been filtered, (noting that the onset signal is depicted by the reference numeral 618 on an output line from the process 512 in FIG. 5), the filter that has the greatest tally is said to be the dominant tempo present in the original music signal 100. Secondary tempos may also be identified using the method. A set of tempos comprising the dominant tempo and the secondary tempos is designated by the reference numeral 518 in FIG. 5.

The timbre of a sequence of sound, which is characteristic of the difference in sounds say between two musical instruments, is largely dependent upon the frequencies present, and their respective magnitudes.

The spectral centroid provides an estimate of "brightness" or "sharpness" of the sound, and is one of the metrics used in the present embodiment in relation to extraction of timbre. This brightness characteristic is given by:

$$S = \sum_W (f)(A) / \sum A$$

where: S=spectral centroid
 ƒ=frequency
 A=Amplitude
 W=Window selected

In order to differentiate between the timbral characteristics of different audio signals, the present embodiment makes use of the Fourier transform of successive 0.5 second windows of the audio signal 100 in question. There is no necessary relationship between the window size used for loudness feature extraction and that used for tempo or other feature extraction. Other techniques for extracting timbre may be used.

Percussivity is that attribute which relates to a family of musical instruments known as "percussion" when considering an orchestra or a band. This family includes such musical instruments as drums, cymbals, castanets and others.

Figure 7:
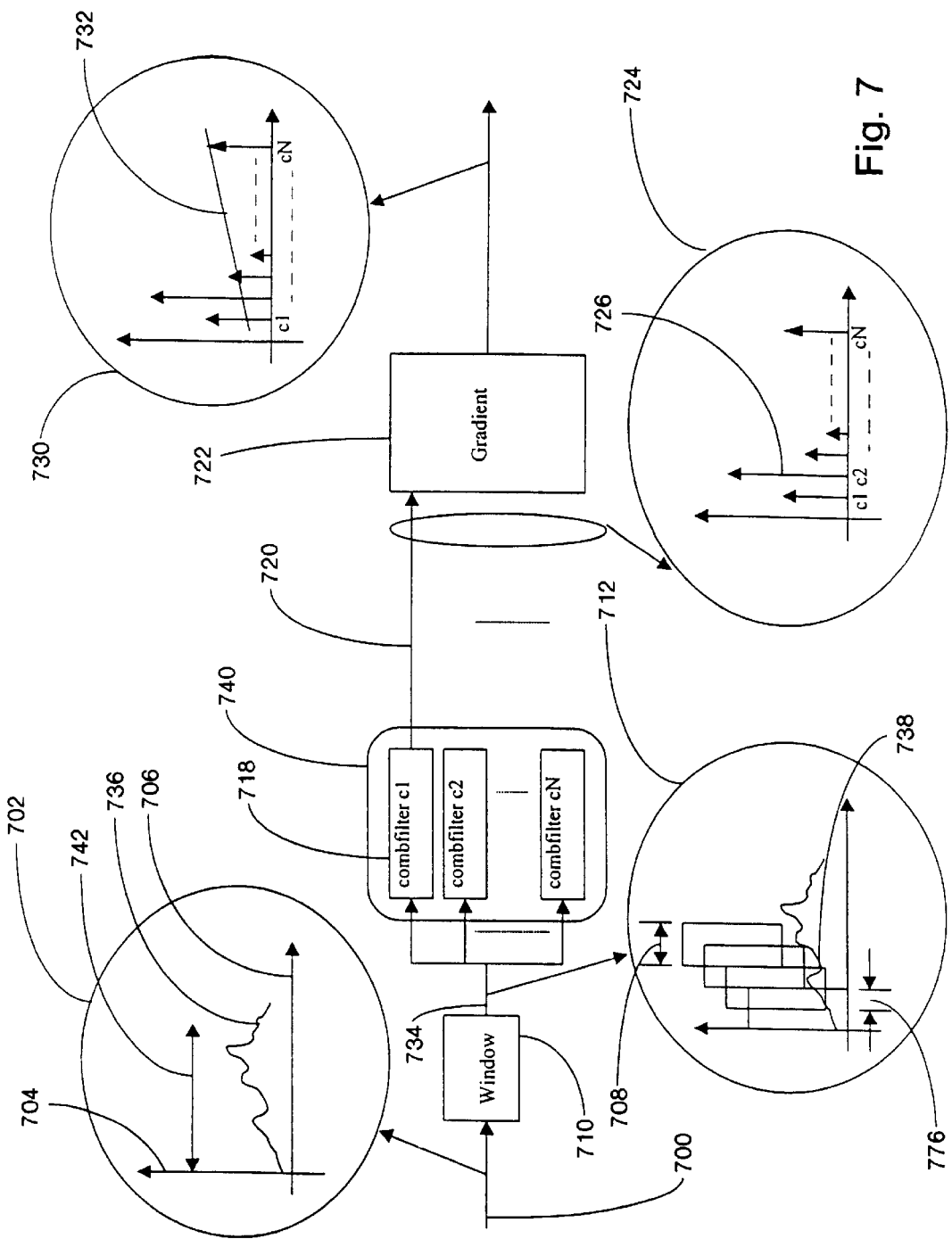
FIG. 7 depicts a process flow diagram for a preferred embodiment of the percussivity estimator.

FIG. 7 depicts a flow diagram of a preferred embodiment of the percussivity estimator. An input signal 736 on a line 700 is analysed for percussivity during a time interval of interest 742. The input signal 736 is described in an inset 702 where the signal 736 is depicted on axes of time 706 and amplitude 704. The signal 736 is operated upon by a windowing process 710 which outputs a windowed signal on a line 734, the windowed signal being shown in more detail in an inset 712. In the inset 712 windows, exemplified by a window 738, each having a predetermined width 708, are overlapped with each other to an extent 776. Each window 738 is passed through a bank of comb filters 740 which is made up of individual comb filters exemplified by a comb filter 718. The structure and operation of an embodiment of the comb filter 718 is presented in more detail in relation to FIG. 9. The comb filter 718 integrates the energy of the signal 736 across the particular window 738 being considered. The bank of comb filters 740, outputs a peak energy 726 for each comb filter 718 in the bank of comb filters 740 for the window 738 being considered, representing the energy at frequencies corresponding to the comb filter. This is shown in an inset 724. It is noted that the outputs exemplified by the output 726 of the comb filter bank 740 are represented on axes of amplitude and frequency, and are spaced according to the frequencies corresponding to the individual comb filters 718. The output from the comb filter bank 740 on a line 720 is processed by a gradient process 722 which determines a straight line of best fit 732 which approximates the output signal exemplified by the signal 726.

Figure 8:
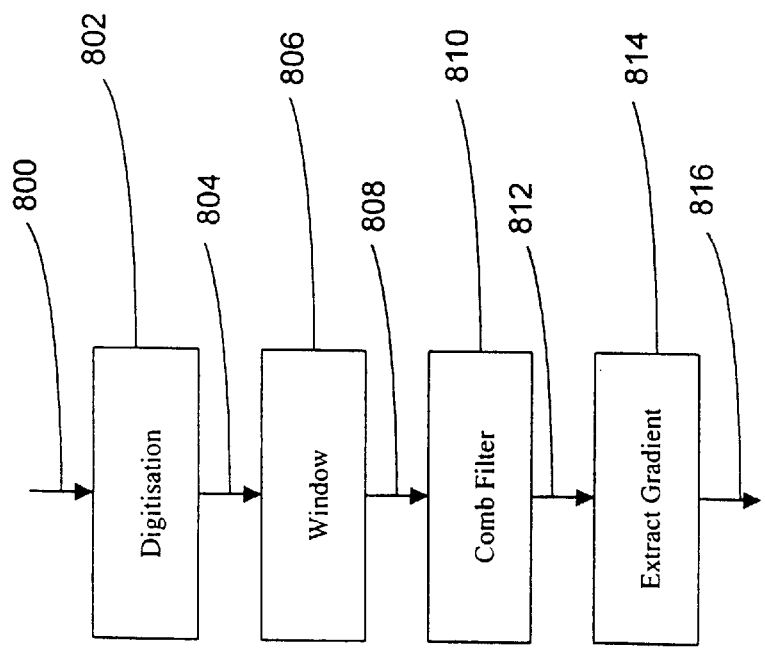
FIG. 8 presents more detail of the preferred embodiment.

FIG. 8 presents a more detailed description of the preferred embodiment of the percussivity estimator as it relates to a digitized input signal. Given an input signal on line 800 to be analysed, the signal is first digitized in a process 802. The digitized signal which is then output on a line 804 is windowed by a process 806 into 100 msec windows, with a 50% overlap between windows. Each window is passed through a bank of comb filters 740 (see FIG. 7) represented by a process 810. The comb filters making up process 810 are spaced at frequencies between 200 Hz and 3000 Hz. The number and spacing of the individual comb filters 718 in the comb filter bank (see FIG. 7) are discussed in more detail in relation to FIG. 9. The linear function on line 812 which is formed from the peak energy output of each comb filter comprising the comb filter bank process 810 is passed to a gradient process 814. The gradient process 814 determines a straight line of best fit which approximates the linear function which is output by the comb filter process 810 on the line 812, and outputs the straight line function on line 816 for further processing.

Figure 9:
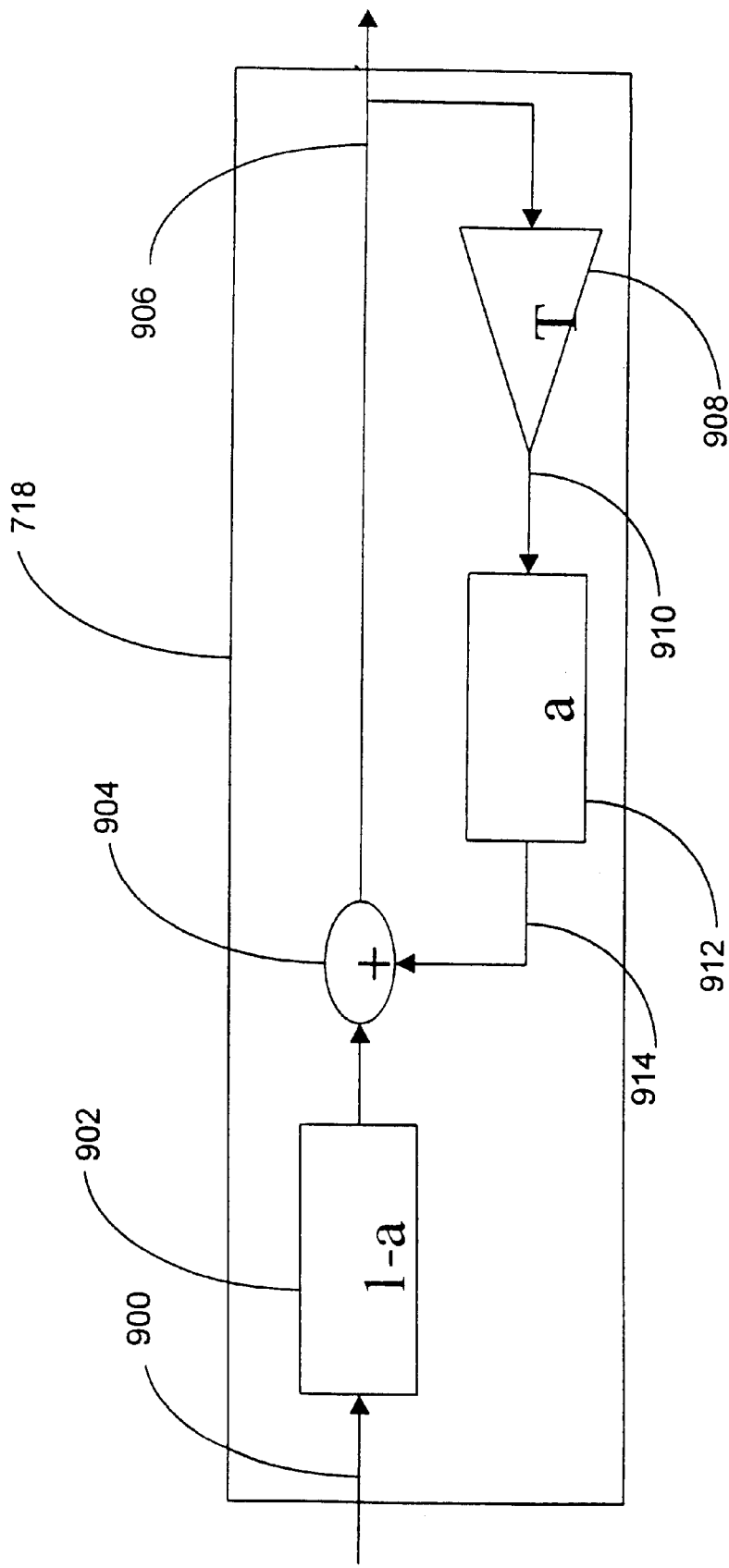
FIG. 9 illustrates a preferred embodiment of a comb filter.

FIG. 9 depicts a block diagram o0 a preferred embodiment of an individual comb filter 718 (see FIG. 7) used in the embodiment of the percussivity estimator. The comb filter 718 is used as a building block to implement the bank of comb filters 740 (see FIG. 7). As described in relation to FIG. 6, each comb filter 718 has a time response which can be represented mathematically as follows:

$$y(t)=a*y(t-T)+[1-a]*x(t) \quad [1]$$

where: x(t) is an input signal 900 to the comb filter;
 y(t) is an output signal 906 from the comb filter;
 T is a delay parameter determining the period of the comb filter; and
 a is a gain factor determining the frequency selectivity of the comb filter.

For each comb filter 718 in the bank of comb filters 740 (see FIG. 7), the delay factor T is selected to be an integral number of samples long, the sample attributes being determined by the process 802 (see FIG. 8). In the preferred embodiment of the comb filter bank 740, the number of filters 718 in the bank of filters 740 is determined by the number of integral sample lengths between the resonant frequency edges, these edges being defined in the embodiment described in relation to FIG. 8 to be 200 Hz and 3000 Hz. The individual filters 718 need not be equally spaced between the frequency edges, however they need to provide substantial coverage of the entire frequency band between the edges.

Figure 10:
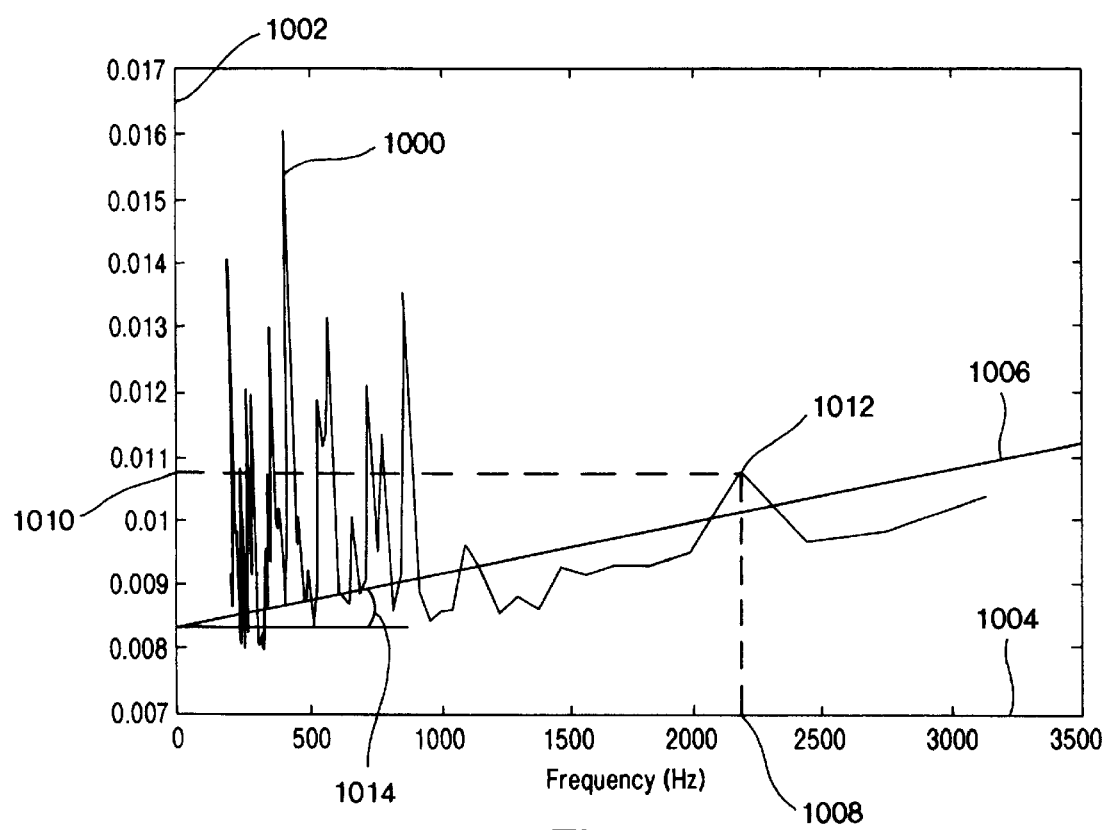
FIG. 10 depicts a linear function obtained from the comb filter output energies.

FIG. 10 depicts a linear function 1000 which is formed from the peak energy outputs of each comb filter 718 in the comb filter bank 740. The ordinate 1010 represents the peak energy output 726 of each comb filter 718 in the filterbank 740 (see FIG. 7), while the abscissa 1004 represents the resonant frequency of each filter 718. Thus an exemplary point 1012 indicates that a filter having a resonant frequency which is depicted by a reference numeral 1008 has a peak energy output depicted by a reference numeral 1010 for the particular window being considered. A line of best fit 1006 is shown, having a gradient 1014 which is representative of the percussivity of the signal 736 within the particular window in question.

Figure 11:
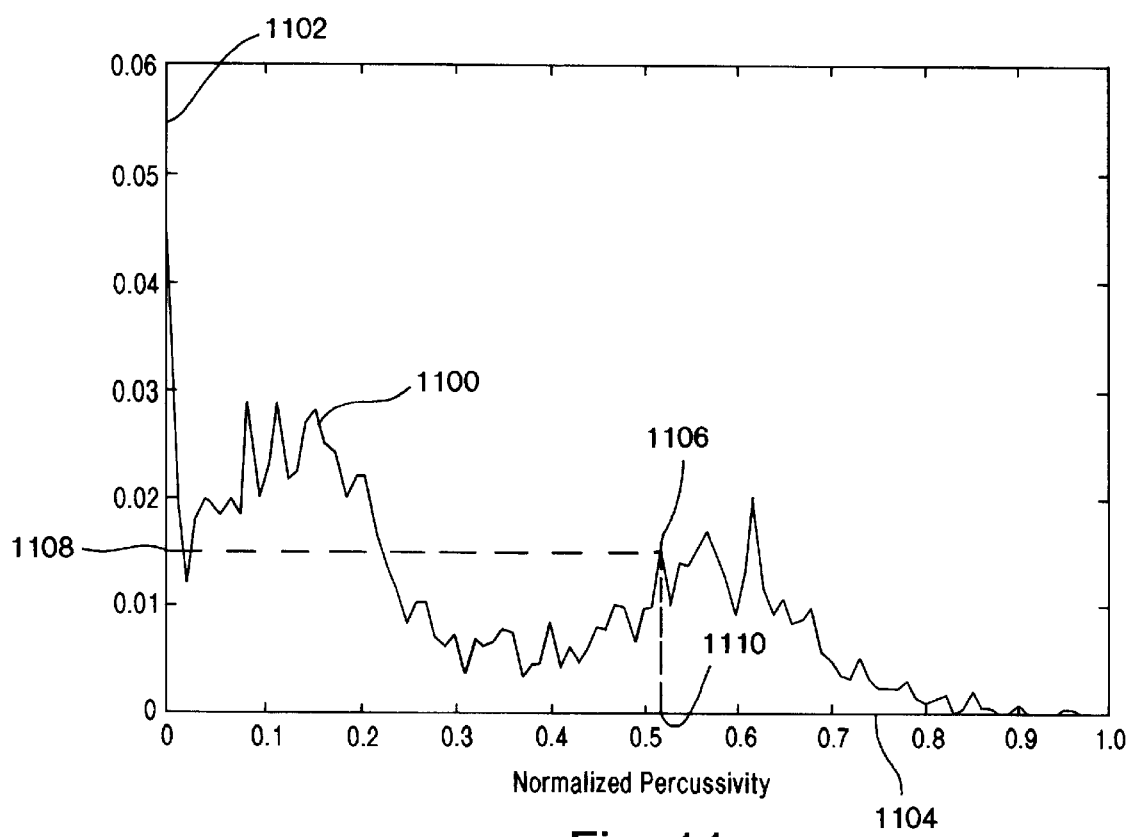
FIG. 11 presents an accumulated histogram of a signal having an overall high percussivity.

FIG. 11 depicts how an aggregate of individual gradients, (say 1014 in FIG. 10), each having been determined for a particular window, (say 738 in FIG. 7), can be consolidated and represented in the form of a histogram 1100 covering the entire period of interest 742 for the signal 736 being considered. An ordinate 1102 represents the fraction of time during the time interval 742 during which a particular percussivity is found to be present. An abscissa 1104 represents a normalized percussivity measure, which can be determined by normalizing all measured percussivity values during the time interval of interest 742 by the maximum percussivity value during the period 742. Thus, a point 1106 indicates that a normalized percussivity value 1110 is found to be present for a fraction 1108 of the total time 742. It is noted that the area under the curve 1100 can also be normalized for different signals being analyzed, in order to enable comparison of percussivity between the different signals. FIG. 11 represents a histogram for a signal having an overall high percussivity.

Figure 12:
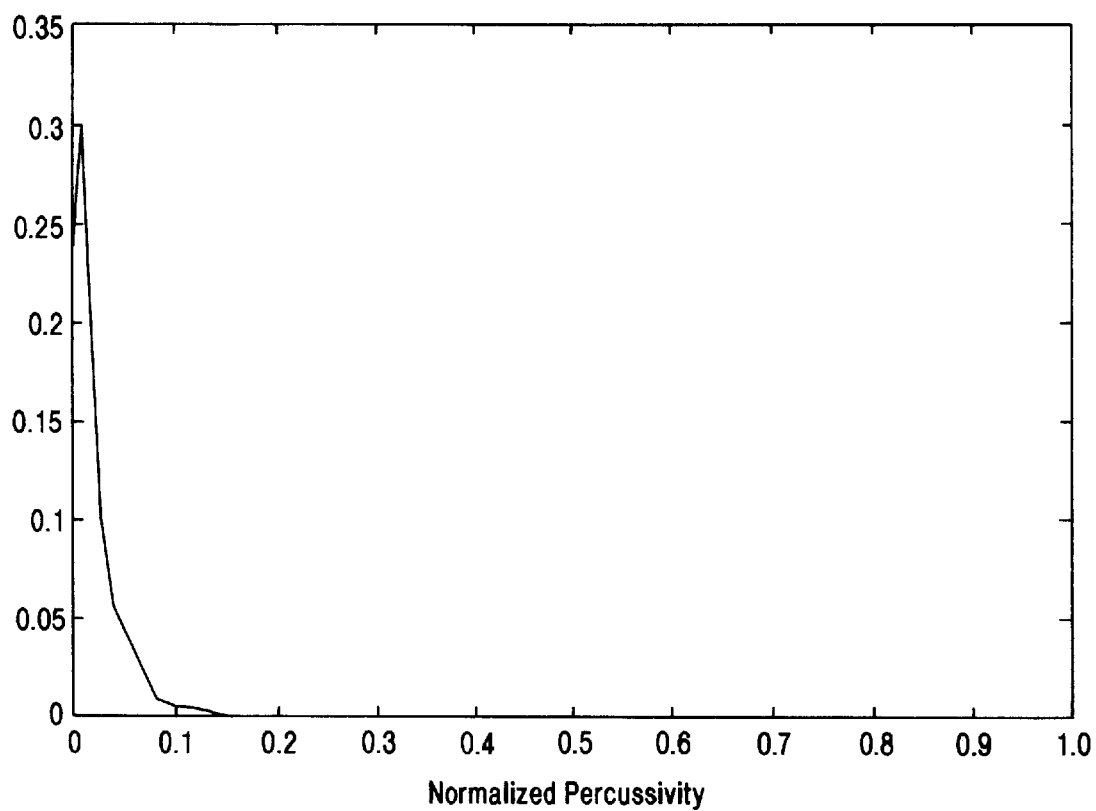
FIG. 12 presents an accumulated histogram of a signal having an overall low percussivity.

FIG. 12 depicts a percussivity histogram for a different signal than the one considered in FIG. 11, the signal in FIG. 12 having an overall low percussivity.

Figure 13:
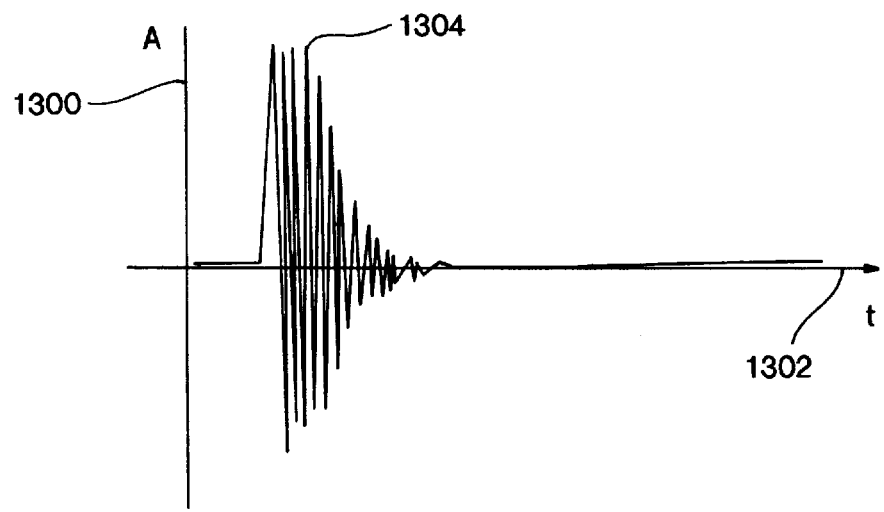
FIG. 13 illustrates a typical percussive signal.

FIG. 13 depicts a typical percussive signal 1304 in the time domain, where the signal 1304 is plotted as a function of an amplitude axis 1300 and a time axis 1302.

The loudness feature is representative of the loudness over substantially the full duration of the piece of music 100 (see FIG. 1). The piece of music 100 is first partitioned into a sequence of time windows, which for the purpose of classification and comparison on the basis of loudness, should be preferably about one half a second wide. There is no necessary relationship between the window size used for loudness feature extraction and that used for tempo or other feature extraction. The Fourier transform of the signal in each window is taken, and then the power in each window is calculated. The magnitude of this power value is an estimate of the loudness of the music within the corresponding half-second interval. Other methods of extracting loudness are known.

Pitch is another feature in the present embodiment determined by the feature extraction means in order to represent music while storing a new piece of music into the music database. The localized pitch is determined over a small window (say 0.1 seconds in this instance) by using a bank of comb filters. There is no necessary relationship between the window size used for pitch feature extraction and that used for tempo or other feature extraction. These comb filters have resonant frequencies covering a range of valid pitches. Advantageously this includes frequencies from around 200 Hz up to around 3500 Hz, and the filters are spaced at intervals determined by the rate at which the original musical signal was sampled. The sampled signal is filtered through the filter bank, and the comb filter that has the greatest output power will have a resonant frequency corresponding to the dominant pitch over the window in question. From these resulting pitches, a histogram of dominant pitches present in the original music is formed. This procedure is followed over substantially the entire duration of the piece of music. The method of pitch extraction employed is one of a number of methods for pitch extraction which exists and other methods may be used.

Returning to FIG. 3, and considering the music input and classification process, when the piece of music 100 is input, it then undergoes feature extraction 304 after which the features are classified in a step 306 and stored in the feature database 308. Substantially in parallel with this process, the actual music piece itself 100 is stored in the music database 302. Thus the piece of music 100 and the associated representative features are stored in two distinct but related databases 302 and 308 respectively. If the music is initially derived from an analogue source, it is first digitized before being input into the feature extraction process 304. The digitization step may be implemented by way of a standard soundcard or, if the music is already in digital form, this digitization step may be bypassed and the digital music used directly for 100. Thus, arbitrary digitization structures including the Musical Instrument Digital Interface (MIDI) format and others may be supported in the system. There are no specific requirements in terms of sampling rate, bits per sample, or channels, but it should be noted that if higher reproduction quality is desirable it is preferable to select an audio resolution close to that of a CD.

Figure 14:
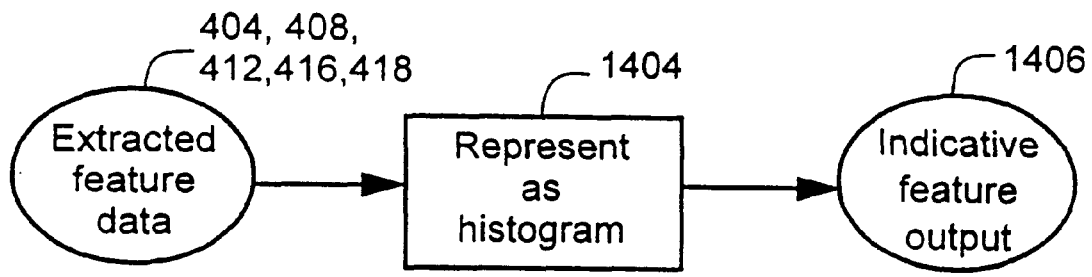
FIG. 14 depicts a generic feature classification process.

FIG. 14 depicts a generic feature classification process. Extracted feature signals 404, 408, 412, 416 and 418 (refer FIG. 4) are accumulated in a process step 1404 as histograms over substantially the whole duration of the piece of music 100 resulting in an indicative feature output 1406 for each extracted feature signal. This output 1406 is stored in the feature database 308 (see FIG. 3). By identifying the N highest tempos in the manner described in FIGS. 5 and 6, a histogram describing the relative occurrence of each tempo across substantially the whole duration of the piece of music 100 can be formed. Similarly, by identifying the M highest volumes, a histogram describing the relative occurrence of each loudness across substantially the whole duration of the piece of music 100 can be formed. Again, by identifying the K dominant pitches, a histogram describing the relative occurrence of each pitch across substantially the whole duration of the piece of music 100 can be formed. The spectral centroid is advantageously used to describe the sharpness in a window. This can be accumulated as a histogram over substantially the full duration of the piece of music being analyzed and by identifying P sharpnesses (one for each window), a histogram describing the relative occurrence of each sharpness across substantially the whole duration of the piece of music 100 can be formed. Accumulation of features as histograms across substantially the entire duration of pieces of music yields a duration independent mechanism for feature classification suitable for search and comparison between pieces of music. This forms the foundation for classification in the music database system. The method described on pages 13 to 16 in relation to FIGS. 7 to 10 is advantageously used to describe the percussivity in a window. This is accumulated as a histogram over substantially the full duration of the piece of music being analyzed and by identifying P percussivities (one for each window), a histogram describing the relative occurrence of each percussivity across substantially the whole duration of the piece of music 100 can be formed.

Figure 15:
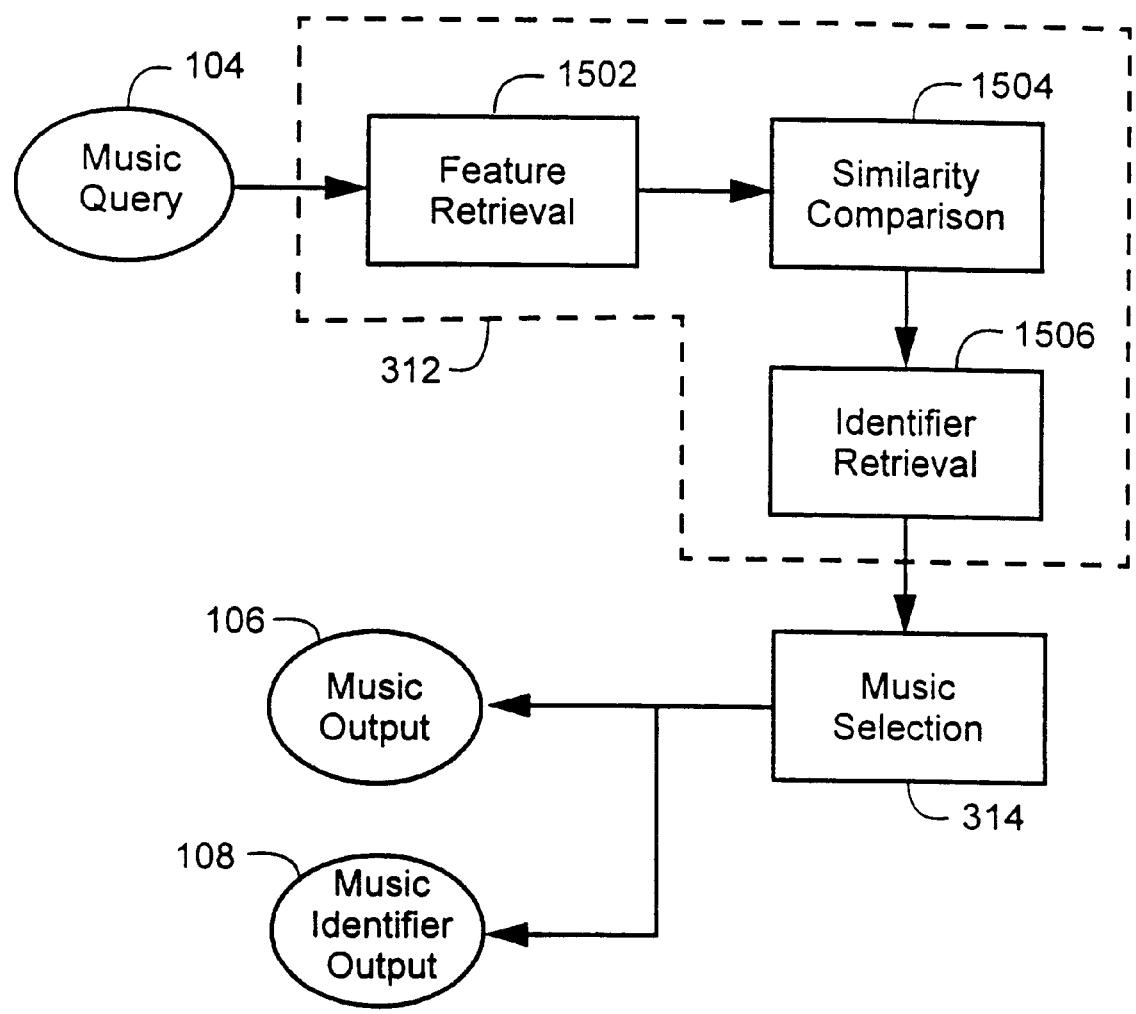
FIG. 15 shows a database query process—music identifiers supplied in query.

FIG. 15 describes a database query process where music identifiers are supplied in the query. The music query 104 (see FIG. 1) may take on a number of forms which include, but are not limited to:

(1) a set of names of known pieces of music and a degree of similarity/dissimilarity specified by a conditional expression (shown underlined) for each piece (e.g. <u>very much like</u> "You can hear me in the harmony" by Harry Conick Jr., <u>a little like</u> "1812 Overture" by Tchaikovsky, and <u>not at all like</u> "Breathless" by Kenny G); and (2) a set of user specified features and a similarity/dissimilarity specification in the form of a conditional expression (e.g. something that has a tempo of around 120 beats per minute, and is <u>mostly loud</u>).

In FIG. 15, the music query 104, containing music identifiers and conditional expressions is input into the feature comparison process 312 (see FIG. 3). This process 312 includes a feature retrieval process 1502 which retrieves the features associated with the pieces of music named in the music query 104 from the feature database 308. Next these retrieved features are passed to a similarity comparison process 1504 which searches the feature database 308 for features satisfying the conditional expression contained in the music query 104 as applied to the features associated with pieces of music named in the music query 104. The results of this comparison are passed to the identifier retrieval process 1506 which retrieves the music identifiers of the pieces of music whose features satisfy the conditional expressions as applied to the identifiers specified in music query 104. These identifiers are passed to the music selection process 314 which enables the output of the desired music 106 and/or music identifiers 108 from music database 302 and feature database 308 respectively.

Figure 16:
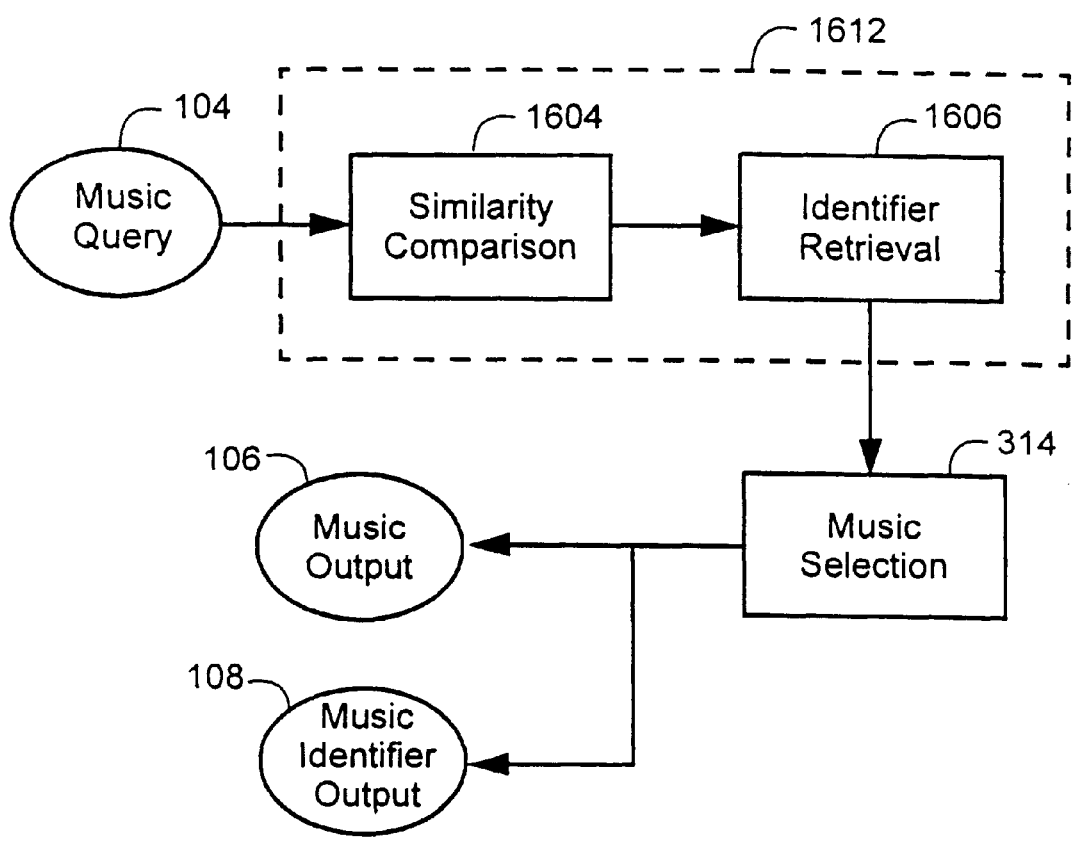
FIG. 16 illustrates a database query process—music features supplied in query.

FIG. 16 describes a database query process where music features are supplied in the music query 104. The music query 104 contains music features and conditional expressions at the query stage 104, and thus in this case the feature retrieval process 1502 is bypassed (see FIG. 15). These provided features are passed to a similarity comparison process 1604 which searches the feature database 308 for features satisfying the conditional expression contained in music query 104 as applied to the features provided in the music query 104. The results of this comparison are passed to an identifier retrieval process 1606 which retrieves the music identifiers of the pieces of music whose features satisfy the conditional expressions in relation to the identifiers specified in music query 104. These identifiers are passed to the music selection process 314 which ensures the output of the desired music 106 and/or music identifiers 108 from the music database 302 and the feature database 308 respectively.

Considering the process of feature comparison 312 (see FIG. 3), a similarity comparison is performed between the features of music stored by the system in the feature database 308 which correspond to pieces of music 100 stored in the music database 302, and features corresponding to the music query 104. Since a number of different features (and feature representations) exist in the feature database 308, the comparisons between corresponding features are advantageously performed differently for each feature, for example:

- comparison between loudness features stored as histograms are made through the use of a histogram difference, or comparison of a number of moments about the mean of each histogram, or other methods that achieve the same goal;
- comparison between tempo features stored as histograms are accomplished by methods such as histogram difference, or comparison of a number of moments about the mean of each histogram or other methods that achieve the same goal,
- comparison between pitch features stored as histograms are performed using a histogram difference, or a comparison of a number of moments about the mean of each histogram. Other methods for comparison of pitch features may also be used,
- comparison between sharpness features stored as histograms are achieved through the use of methods such as histogram difference, or comparison of a number of moments about the mean of each histogram, or other methods that achieve the same goal, and
- comparison between percussivity features stored as histograms are achieved through the use of methods such as histogram difference, or comparison of a number of moments about the mean of each histogram, or other methods that achieve the same goal.

Once the comparison of each of the relevant features has been made, the overall degree of similarity is ascertained. A simple, yet effective way of determining this is through the use of a distance metric (also known as the Minkowski metric with r=1), with each of the feature comparison results representing an individual difference along an orthogonal axis.

Figure 17:
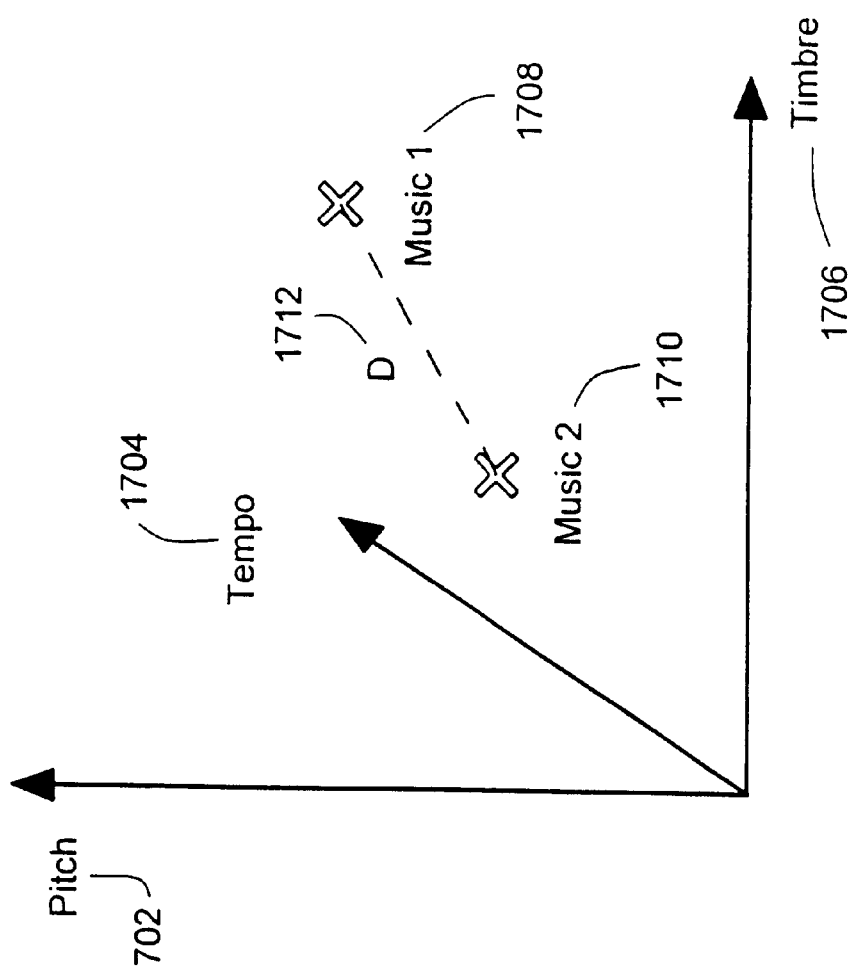
FIG. 17 illustrates a distance metric used to assess similarity between two pieces of music.

FIG. 17 illustrates a distance metric used to assess the similarity between two pieces of music where D is the distance between the two pieces of music 1708 and 1710 (only 3 features are shown for ease of representation). In this case, a smaller value of D represents a greater similarity. D is advantageously represented by:

$$\text{SQRT}((\text{loudness histogram difference})^2 + (\text{tempo histogram difference})^2 + (\text{pitch histogram difference})^2 + (\text{timbre histogram difference})^2)$$

FIG. 17 illustrates the distance between two pieces of music 1708, 1710, these pieces of music being defined in terms of three exemplary features namely pitch 1702, tempo 1704, and sharpness 1706. The distance D (ie 1712) represents the distance between the pieces of music 1710 and 1708 when measured in this context.

The above method will be partially described for a specific query 104 namely "Find a piece of music similar to piece A", where the database contains pieces of music A, B, C, and D. This query 104 is of a type described in FIG. 15 where music identifiers (ie the name of the piece of music "A") and a conditional expression ("similar to") is provided in the query 104.

Each piece of music stored in the database is represented by a number of features that have been extracted when the pieces were classified and stored in the database. For the sake of simplicity the example presented is restricted to two features, namely tempo and sharpness, where both features are represented by simplified histograms.

The four music pieces to be considered are named A, B, C and D. Their corresponding feature histograms are illustrated in FIGS. 18–21.

Figure 18A:
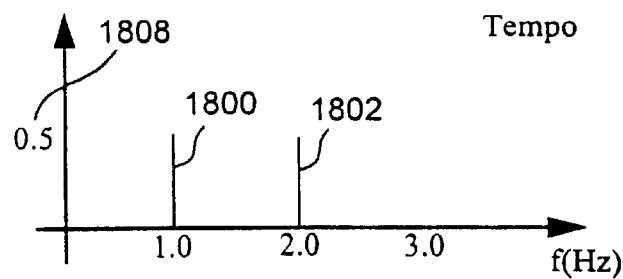
FIGS. 18–21 depict feature representations for four pieces of music.
Figure 18B:
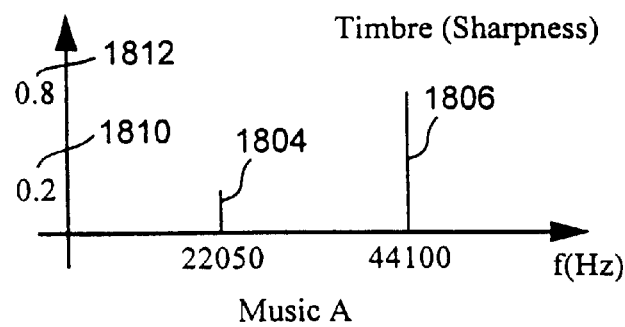
Figure 19A:
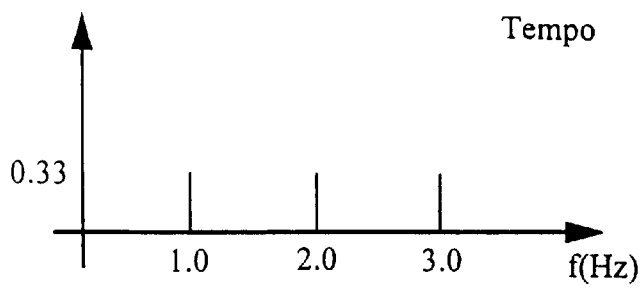
Figure 19B:
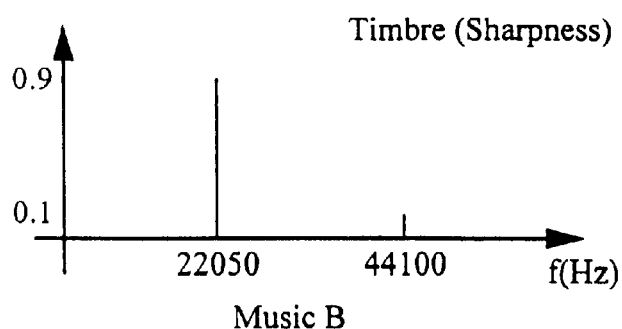
Figure 20A:
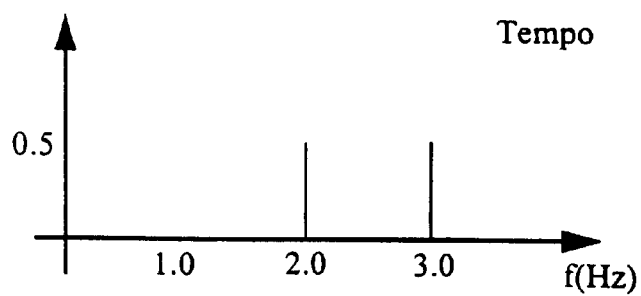
Figure 20B:
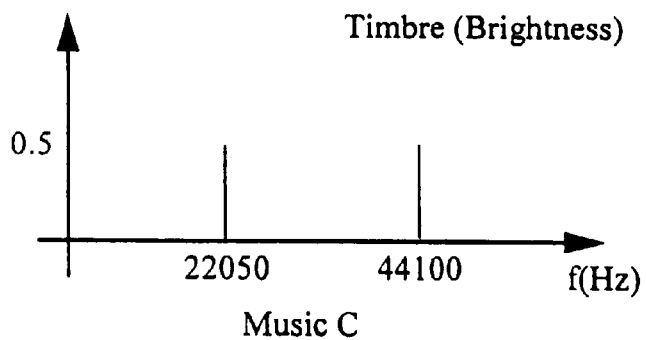
Figure 21A:
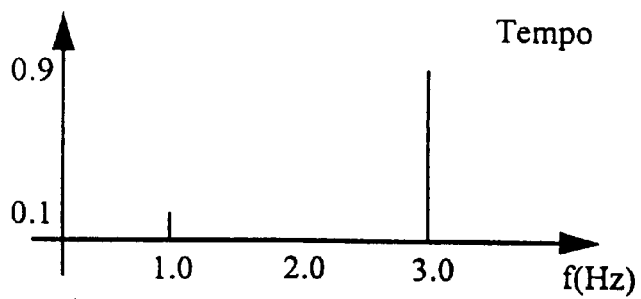
Figure 21B:
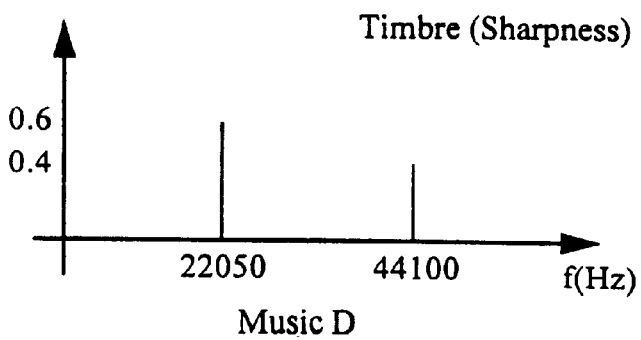

FIG. 18 illustrates a tempo histogram and a timbre (alternatively called sharpness) histogram for piece of music A. This piece of music is shown to have a tempo of 1 Hz (or 60 beats/min) (ie 1800) for 0.5 or 50% of the time (indicated by a reference numeral 1808) and a beat of 2 Hz (or 120 beats/minute) (ie 1802) for 50% of the time (indicated by a reference numeral 1808). The piece of music displays a brightness of 22050 Hz (ie 1804) for 20% of the time (indicated by a reference numeral 1810) and a brightness of 44100 Hz (ie 1806) for 80% of the time (indicated by a reference numeral 1812). FIGS. 19–21 display similar features for pieces of music B–D.

When the query is presented, the following sequence of operations is performed:

- Comparison of the features of A and B,
- Comparison of the features of A and C,
- Comparison of the features of A and D, and
- Selection of the music that is least distant from A.

Since all features of the music in the database are preferably represented as histograms, comparisons between these features is based on a comparison between the histograms. Two methods that are useful in forming this comparison are the histogram difference, and the comparison of moments.

Considering the first method, the histogram difference is performed by comparing the relative occurrence frequencies of the different observations, taking a sum over all these comparisons and then normalizing by the number of histograms being compared. If both histograms are individually normalized such that their individual integral sums are equal to 1.0, then the maximum histogram difference will be 2.0 (and if the absolute value of each comparison is taken, the minimum difference will be 0.0).

Considering the second method, comparison of moments is achieved by considering the differences between a number of moments about the origin of each histogram. The general form may be used to calculate moments about the origin:

$$\mu_k = \sum_{all\ x} x^k \cdot f(x)$$

where: $\mu_k$ is the Kth moment about the origin,
$x^k$ is the Xth component of the histogram, and
$f(x)$ is the value of the histogram of $x^k$.

It is also common to normalize the moments with respect to the second moment about the origin, in order to make them independent of the scale of measurement:

$$\mu_k \mu_2^{-k/2}$$

With reference to FIGS. 18 and 19, for the query 104 "similar to A" employing histogram difference, the calculation of distance is performed as follows:

The difference between A and B in regard to tempo is:

$$\frac{|0.5-0.33|+|0.5-0.33|+|0-0.33|}{2} = 0.335$$

where the number of terms in the numerator is determined by the number of histogram points being compared, and the denominator is determined by the fact that two histograms are being compared.

Similarly, for A and B in regard to timbre:

$$\frac{|0.2-0.9|+|0.8-0.1|}{2} = 0.7$$

Thus, distance between A and B is given by:

$$\sqrt{0.7^2 + 0.335^2} = 0.776$$

If we consider the histograms in FIGS. 18–21 for the features extracted from the piece of music A, B, C and D:

Music A, tempo histogram:

$\mu_2 = 0.5 \times 1.0^2 + 0.5 \times 2.0^2 + 0 \times 3.0^2 = 2.50$ $\mu_3 = 0.5 \times 1.0^3 + 0.5 \times 2.0^3 + 0 \times 3.0^3 = 4.50$ $\mu_4 = 0.5 \times 1.0^4 + 0.5 \times 2.0^4 + 0 \times 3.0^4 = 8.50$ $\mu_3 \mu_2^{-3/2} = 1.14$ $\mu_4 \mu_2^{-4/2} = 1.36$ Music A, sharpness histogram:

$\mu_2 = 1.653 \times 10^9$ $\mu_3 = 7.076 \times 10^{13}$ $\mu_4 = 3.073 \times 10^{18}$ $\mu_3 \mu_2^{-3/2} = 1.05$ $\mu_4 \mu_2^{-4/2} = 1.12$ Music B, tempo histogram:

$\mu_2 = 4.62$ $\mu_3 = 11.88$ $\mu_4 = 32.34$ $\mu_3 \mu_2^{-3/2} = 1.20$ $\mu_4 \mu_2^{-4/2} = 1.52$

Music B, sharpness histogram:

$\mu_2 = 6.321 \times 10^8$ $\mu_3 = 1.823 \times 10^{13}$ $\mu_4 = 5.91 \times 10^{17}$ $\mu_3 \mu_2^{-3/2} = 1.15$ $\mu_4 \mu_2^{-4/2} = 1.48$ Comparisons for the query "similar to A":
A and B tempo:

$|1.14-1.20|+|1.36-1.52|=0.22$

A and B sharpness:

$|1.05-1.15|+|1.12-1.48|=0.46$

A and B distance:

$\sqrt{0.22^2 + 0.46^2} = 0.51$

The above analysis is only partially shown for the sake of brevity, however if fully expanded, it is seen that in both histogram difference and moment methods, Music B would be selected by the query 104 as being "similar to A", since the calculated distance between Music A and Music B is smallest when compared to C, D.

In the above example, the query 104 was "find a piece of music similar to piece A" and thus the method sought to establish which pieces of music B, C and D are at a distance smallest from A.

In a more complex query 104 of the form, for example, "find a piece of music verysimilar to A, a little bit like B, and not at all like C", the same general form of analysis as illustrated in the previous example would be used. In this case however, the other pieces of music in the database namely D, E, . . . , K, . . . would be assessed in order to establish which piece of music had features which could simultaneously satisfy the requirements of being at a minimum distance from A, a larger distance from B, and a maximum distance from C.

It is further possible to apply a weighting to each individual feature in order to bias the overall distance metric in some fashion (for example biasing in favour of tempo similarity rather than loudness similarity).

In considering similarity assessment on the basis of either the histogram difference, or the comparison of moments, these being applied to the attributes of pitch, loudness, tempo, and timbre (i.e. sharpness and percussivity), it is found that two-pass assessment provides better classification results in some cases. The two-pass assessment process performs a first assessment on the basis of loudness, percussivity and sharpness, and then a second sorting process based on tempo. In the present embodiments, it is found that the feature of pitch may be omitted from the similarity assessment process without significantly degrading the overall similarity assessment results.

In considering similarity assessment using the comparison of moments process, good results are produced by selecting particular moments for each feature as shown in the following table:

| Feature | Moments |
| --- | --- |
| loudness | mode, mean, variance |
| sharpness | mode, mean, variance |
| percussivity | variance |
| tempo | mode, mode tally, variance | where "mean" and "variance" are determined in accordance with the following general form which expresses moments about the mean:

where: "mean"=$\mu_k$ for k=1; and

"variance"=$\mu_k$ for k=2.

The "mode", in particular having regard to tempo, represents the most frequently occurring i.e. the "dominant" tempo in the tempo histogram, and is thus the tempo associated with the peak of the histogram. The "mode tally" is the amplitude of the peak, and represents the relative strength of the dominant tempo.

Application of clustering techniques to a complete set of moments corresponding to the extracted features, including the mode of each histogram, provides better classification results in some cases. Use of Bayesian estimation produces a "best" set of classes by which a given dataset may be classified.

Figure 22:
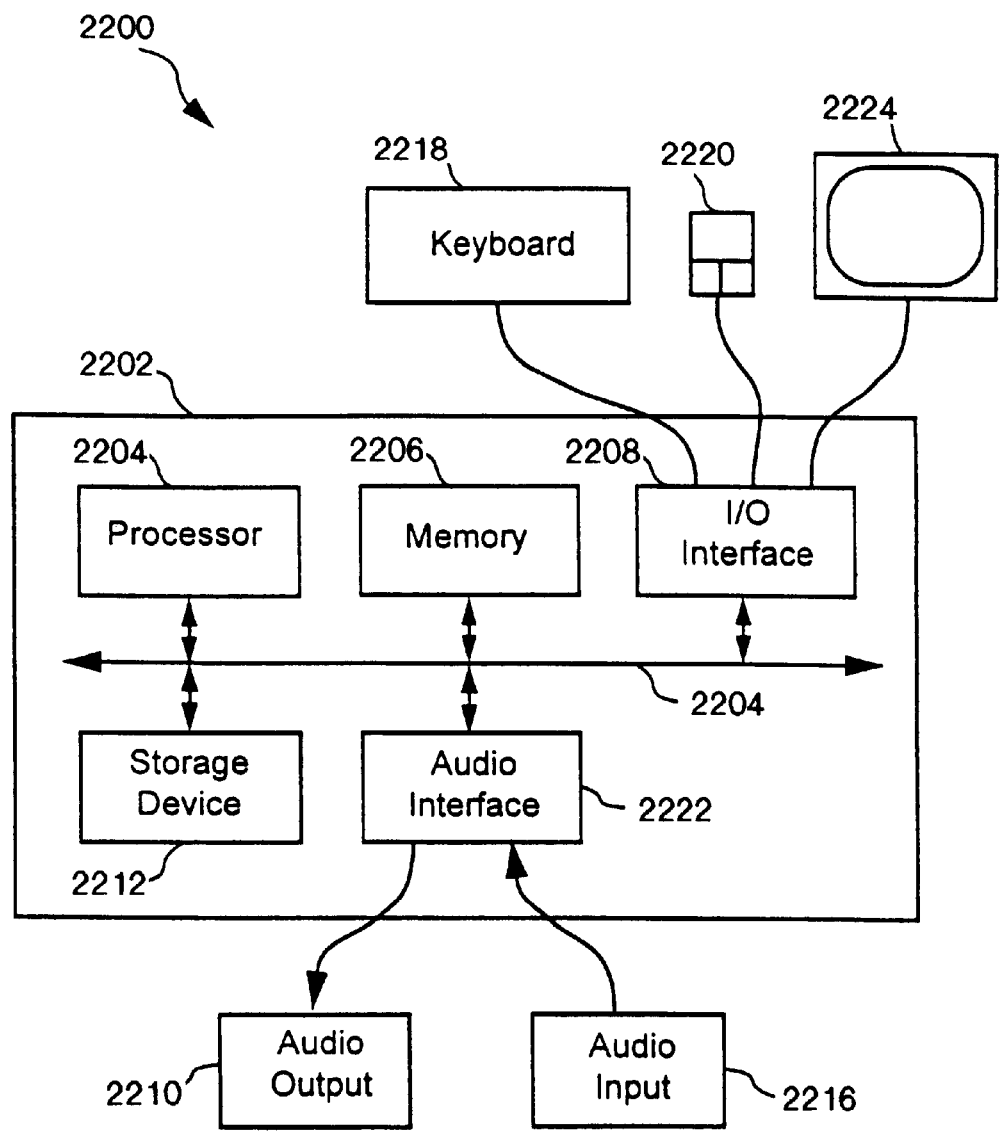
FIG. 22 depicts a general purpose computer upon which the preferred embodiment of the invention can be practiced.

FIG. 22 shows how the system can preferably be practiced using a conventional general-purpose computer 2200 wherein the various processes described may be implemented as software executing on the computer 2200. In particular, the various process steps are effected by instructions in the software that are carried out by the computer 2200. The software may be stored in a computer readable medium, is loaded onto the computer 2200 from the medium, and then executed by the computer 2200. The use of the computer program product in the computer preferably effects an apparatus for (i) extracting one or more features from a music signal, said features including, for instance, tempo, loudness, pitch, and timbre, (ii) classification of music using extracted features, and (iii) method of querying a music database. Corresponding systems upon which the above method steps may be practiced may be implemented as described by software executing on the above mentioned general-purpose computer 2200. The computer system 2200 includes a computer module 2202, an audio input card 2216, and input devices 2218, 2220. In addition, the computer system 2200 can have any of a number of other output devices including an audio output card 2210 and output display 2224. The computer system 2200 can be connected to one or more other computers using an appropriate communication channel such as a modem communications path, a computer network, or the like. The computer network may include a local area network (LAN), a wide area network (WAN), an Intranet, and/or Internet. Thus, for example, pieces of music 100 may be input via the audio input card 2216, music queries may be input via the keyboard 2218, desired music 106 may be output via the audio output card 2210 and desired music identifiers such as the names of the desired pieces of music may be output via the display device 2224. The network embodiment shown in FIG. 2 would be implemented by using the communication channels to connect server computers to the network 206 via access lines 204. Client computers would be connected to the network 206 via access lines 208 also using the computer communication channels. The computer 2202 itself includes a central processing unit(s) (simply referred to as a processor hereinafter) 2204, a memory 2206 which may include random access memory (RAM) and read-only memory (ROM), an input/output (IO) interface 2208, an audio input interface 2222, and one or more storage devices generally represented by a block 2212. The storage device(s) 2212 can include one or more of the following: a floppy disk, a hard disk drive, a magneto-optical disk drive, CD-ROM, magnetic tape or any other of a number of non-volatile storage devices well known to those skilled in the art. Each of the components 2204, 2206, 2208, 2212 and 2222, is typically connected to one or more of the other devices via a bus 2204 that in turn can include data, address, and control buses. The audio interface 2222 is connected to the audio input 2216 and audio output 2210 cards, and provides audio input from the audio input card 2216 to the computer 2202 and from the computer 2202 to the audio output card 2210.

The preferred embodiment of the invention can, alternatively, be implemented on one or more integrated circuits. This mode of implementation allows incorporation of the various system elements into individual pieces of equipment where the functionality provided by such apparatus is required.

The foregoing describes a number of embodiments for the present invention. Further modifications can be made thereto without departing from the scope of the inventive concept.

What is claimed is:

1. A method for querying a music database, which contains a plurality of pieces of music, the method comprising steps of:

classifying, using feature extraction on said plurality of pieces of music using steps of:
(i) segmenting each piece of music into a plurality of windows;
(ii) extracting at least one characteristic feature in each of said windows; and
(iii) indexing said each piece of music dependent upon extracted features;

forming a request which specifies (i) at least one of a name of a piece of music and features characterizing the piece of music, and (ii) at least one conditional expression;

comparing the features characterizing the specified piece of music to corresponding features characterizing other pieces of music in the database;

calculating corresponding distances between the specified piece of music and the other pieces of music based on comparisons; and identifying pieces of music which are at distances from the specified piece of music which satisfy the at least one conditional expression.

2. A method according to claim 1, including a further step of:

outputting at least one of (i) the identified pieces of music and (ii) the names of said pieces.

3. A method according to claim 2, whereby the at least one of (i) the identified pieces of music and (ii) the names of said pieces are in a class of the plurality of pieces of music in the database.

4. A method according to claim 1, wherein the calculating step comprises sub-steps of:

calculating corresponding distances based on a first relationship between (i) a loudness, a percussivity, and a sharpness of the specified piece of music, and (ii) a loudness, a percussivity, and a sharpness of each said other piece of music; and sorting, on the basis of a second relationship between (i) a tempo of the specified piece of music, and (ii) a tempo of each said other piece of music.

5. A method according to claim 1, wherein the comparing step is performed in relation to pieces of music in a class of the plurality of pieces of music in the database.

6. A method according to claim 1, wherein a first feature extracted in the extracting step is at least one tempo extracted from a digitized music signal, the extracting step comprising sub-steps of:

determining values indicative of an energy in at least one window;

locating peaks of an energy signal derived from energy values in said at least one window;

generating an onset signal comprising pulses having peaks which substantially coincide with peaks of the energy signal;

filtering the onset signal through a plurality of comb filter processes having resonant frequencies located according to frequencies derived from the window segmenting step;

accumulating an energy in each filter process over a duration of the music signal; and identifying filter processes having Nth highest energies wherein resonant frequencies of the identified processes are representative of at least one tempo in the music signal.

7. A method according to claim 6, wherein the determining sub-step comprises sub-sub-steps of:

determining transform components for the music signal in each window; and adding amplitudes of the components in each window to form a component sum, said component sum being indicative of energy in a window.

8. A method according to claim 6, wherein after the locating step and prior to the generating step the method comprises a further sub-step of:

low pass filtering the energy signal.

9. A method according to claim 6, whereby the generating step comprises sub-steps of:

differentiating the energy signal; and half-wave rectifying the differentiated signal to form the onset signal.

10. A method according to claim 6, wherein the generating step comprises sub-sub-steps of:

sampling the energy signal;

comparing consecutive samples to determine a positive peak; and generating a single pulse when each positive peak is detected.

11. A method according to claim 6, wherein the filter process resonant frequencies span a frequency range substantially between 1 Hz and 4 Hz.

12. A method according to claim 1, wherein a second feature extracted in the extracting step is a percussivity of a signal, the extracting step comprising, for each window, sub-steps of:

filtering by a plurality of filters;

determining an output for each filter;

determining a function of the filter output values;

determining a gradient for the linear function; and determining a percussivity as a function of the gradient.

13. A method according to claim 12, wherein the segmenting sub-step comprises sub-sub-steps of:

selecting a window width;

selecting a window overlap extent; and segmenting the signal into windows having the selected window width, wherein the windows overlap each other to the selected overlap extent.

14. A method according to claim 12, whereby the filtering sub-step utilises comb filters.

15. A method according to claim 12, whereby the gradient determining step determines a straight line of best fit to the linear function.

16. A method according to claim 12, whereby percussivity values determined in the percussivity determining step for a window are consolidated in a histogram.

17. A method for querying a database according to claim 1, comprising a further step of:

determining said associated parameters for the at least one specified piece of music if the parameters have not been specified.

18. A method for querying a music database according to claim 1, wherein the corresponding distances are calculated along orthogonal axes.

19. A method for querying a database according to claim 1, wherein said arranging step arranges the features in histograms wherein the histograms are representative of the features over the entire piece of music.

20. An apparatus for querying a music database, which contains a plurality of pieces of music, the apparatus comprising:

classifying means for classifying, using feature extraction on said plurality of pieces of music, said classifying means comprising:
  (i) segmenting means for segmenting each piece of music into a plurality of windows;
  (ii) extracting means for extracting at least one characteristic feature in each of said windows; and
  (iii) indexing means for indexing said each piece of music dependent upon extracted features;

forming means for forming a request which specifies (i) at least one of a name of a piece of music and features characterizing the piece of music, and (ii) at least one conditional expression;

comparing means for comparing the features characterizing the specified piece of music to corresponding features characterizing other pieces of music in the database;

calculating means for calculating corresponding distances between the specified piece of music and the other pieces of music based on comparisons; and identifying means for identifying pieces of music which are at distances from the specified piece of music which satisfy the at least one conditional expression.

21. An apparatus according to claim 20, wherein the apparatus further comprises:

an output means for outputting at least one of (i) the identified pieces of music and (ii) the names of said pieces.

22. An apparatus according to claim 20, wherein the distance determination means comprises:

first distance determination means for calculating corresponding distances based on a first relationship between (i) a loudness, a percussivity, and a sharpness of the specified piece of music, and (ii) a loudness, a percussivity, and a sharpness of each other piece of music; and a sorting means for sorting, on the basis of a second relationship between (i) a tempo of the specified piece of music, and (ii) a tempo of each other piece of music.

23. An apparatus according to claim 20, further comprising a means for clustering the pieces of music in the database into classes.

24. An apparatus according to claim 20, wherein a first feature extracted by the feature extraction means is at least one tempo extracted from a digitized music signal, and wherein the feature extraction means comprises:
   energy determination means for determining values indicative of the energy in each window;
   peak location determination means for locating peaks of an energy signal derived from the energy values in each window;
   onset signal generation means for generating an onset signal comprising pulses having peaks which substantially coincide with peaks of the energy signal;
   a plurality of comb filter means for filtering the onset signal wherein the plurality of comb filter means have resonant frequencies located according to frequencies derived by the window segmentation means;
   energy accumulation means for accumulating an energy in each filter process over a duration of the music signal; and
   identification means for identifying filter processes having Nth highest energies wherein resonant frequencies of the identified processes are representative of at least one tempo in the music signal.

25. An apparatus according to claim 24, wherein the energy determination means comprise:
   transform determination means for determining transform components for the music signal in at least one window; and
   addition means for adding amplitudes of components in each window to form a component sum, said component sum being indicative of energy in a window.

26. An apparatus according to claim 24, further comprising low pass filtering means for low pass filtering the energy signal located by the peak location determination means prior to forming the onset signal by the onset signal generation means.

27. An apparatus according to claim 24, wherein the onset signal generation means comprise:
   differentiating means for differentiating the energy signal; and
   rectification means for half-wave rectifying a differentiated signal to form the onset signal.

28. An apparatus according to claim 24, wherein the onset signal generation means comprise:
   sampling means for sampling the energy signal;
   comparator means for comparing consecutive samples to determine a positive peak; and
   pulse generation means for generating a single pulse when a positive peak is detected.

29. An apparatus according to claim 24, wherein the comb filter means resonant frequencies span a frequency range substantially between 1 Hz and 4 Hz.

30. An apparatus according to claim 20, wherein a second feature extracted by the feature extraction means is a percussivity of a signal, and wherein the feature extraction means comprise:
   filtering means for filtering by a plurality of filters;
   filter output determination means for determining an output for each filter;
   function determination means for determining a function of the filter output values;
   gradient determination means for determining a gradient for the linear function; and
   percussivity determination means for determining a percussivity as a function of the gradient.

31. An apparatus according to claim 30, wherein the segmentation means comprise:
   selection means for selecting a window width;
   overlap determination means for selecting a window overlap extent; and
   segmentation means for segmenting the signal into windows, a window having the selected window width and the windows overlapping each other to the selected overlap extent.

32. An apparatus according to claim 30, wherein the filtering means are comb filters.

33. An apparatus according to claim 30, wherein the gradient determination means comprises means for determining a straight line of best fit to the linear function.

34. An apparatus according to claim 30, wherein the percussivity determination means consolidate the percussivity for each window into a histogram.

35. An apparatus for querying a music database according to claim 20, further comprising a parameter determination means for determining associated parameters for the specified pieces of music if the parameters have not been specified.

36. An apparatus according to claim 20, wherein said arranging means arrange the features in histograms representative of the features over the entire piece of music.

37. An apparatus for querying a music database according to claim 20, wherein the distance determination means calculate the distances along orthogonal axes.

38. A computer readable memory medium for storing a program for apparatus for querying a music database which contains a plurality of pieces of music, said program comprising:
   code for a classifying step for classifying, using feature extraction on said plurality of pieces of music, said code for said classifying step comprising:
      (i) code for a segmenting step for segmenting each piece of music into a plurality of windows;
      (ii) code for an extracting step for extracting at least one characteristic feature in each of said windows; and
      (iii) code for an indexing step for indexing said each piece of music dependent upon extracted features;
   code for a forming step for forming a request which specifies (i) at least one of a name of a piece of music and features characterizing the piece of music, and (ii) at least one conditional expression;
   code for a comparing step for comparing the features characterizing the specified piece of music to corresponding features characterizing other pieces of music in the database;
   code for a calculating step for calculating corresponding distances between the specified piece of music and the other pieces of music based on comparisons; and
   code for an identifying step for identifying pieces of music which are at distances from the specified piece of music which satisfy the at least one conditional expression.

39. A computer readable memory medium according to claim 38 further comprising:
   code for an outputting step for outputting at least one of (i) the identified pieces of music and (ii) the names of said pieces.

40. A computer readable memory medium according to claim 38, wherein the code for the distance calculating step comprises:
   code for a calculating step for calculating corresponding distances based on a first relationship between (i) a loudness, a percussivity, and a sharpness of the specified piece of music, and (ii) a loudness, a percussivity, and a sharpness of each other piece of music; and code for a sorting step for sorting, on the basis of a second relationship between (i) a tempo of the specified piece of music, and (ii) a tempo of each other piece of music.

41. A computer readable memory medium according to claim 38, wherein the code for the comparing step further comprises code for a clustering step for clustering the pieces of music in the database into classes.

42. A computer readable memory medium according to claim 38, wherein a first feature extracted in the feature extraction step is at least one tempo extracted from a digitized music signal, and wherein said program further comprises:

code for an energy determination step for determining values indicative of the energy in each window;

code for a peak location determination step for locating the peaks of an energy signal which is derived from the energy values in each window;

code for an onset signal generation step for generating an onset signal comprising pulses having peaks which substantially coincide with the peaks of the energy signal;

code for a plurality of comb filter steps for filtering the onset signal wherein the plurality of comb filter steps effect resonant frequencies located according to frequencies derived from the window segmentation step;

code for an energy accumulation step for accumulating an energy in each filter process over a duration of the music signal; and code for an identification step for identifying the filter processes having Nth highest energies wherein resonant frequencies of the identified processes are representative of at least one tempo in the music signal.

43. A computer readable memory medium according to claim 42, wherein said code relating to the energy determination step comprises:

code for a transform determination step for determining transform components for the music signal in each window; and code for an addition step for adding amplitudes of the components in each window to form a component sum, said component sum being indicative of energy in a window.

44. A computer readable memory medium according to claim 42, said program further comprising code for a low pass filtering step for low pass filtering the energy signal after locating the peaks of an energy signal in the peak location determination step and prior to the onset signal generation step.

45. A computer readable memory medium according to claim 42, wherein said code relating to the onset signal generation step comprises:

code for a differentiating step for differentiating the energy signal; and code for a rectification step for half-wave rectifying the differentiated signal to form the onset signal.

46. A computer readable memory medium according to claim 42, wherein said code relating to the onset signal generation step comprises:

code for a sampling step for sampling the energy signal;

code for a comparator step for comparing consecutive samples to determine a positive peak; and code for a pulse generation step for generating a single pulse when each positive peak is detected.

47. A computer readable memory medium according to claim 42, said program relating to the filter means resonant frequencies spaning a frequency range substantially between 1 Hz and 4 Hz.

48. A computer readable memory medium according to claim 38, wherein a second feature extracted in the feature extraction step is a percussivity of a signal, and wherein said feature extraction step comprises:

code for a filtering step for filtering by a plurality of filters;

code for a filter output determination step for determining an output for each filter;

code for a function determination step for determining a function of the filter output values;

code for a gradient determination step for determining a gradient for the linear function; and code for a percussivity determination step for determining a percussivity as a function of the gradient.

49. A computer readable memory medium according to claim 48, wherein said code relating to the segmentation step comprises:

code for a selection step for selecting a window width;

code for an overlap determination step for selecting a window overlap extent; and code for a segmentation step for segmenting the signal into windows each window having a selected window width and the windows overlapping each other to a selected overlap extent.

50. A computer readable memory medium according to claim 48, wherein the filtering step performs comb filtering.

51. A computer readable memory medium according to claim 48, wherein said gradient determination step determines a straight line of best fit to the linear function.

52. A computer readable memory medium according to claim 48, wherein said percussivity determination step consolidates the percussivity for each window into a histogram.

53. A computer readable memory medium according to claim 38, further comprising code for a determining step for determining said associated parameters for the at least one specified piece of music if the parameters have not been specified.

54. A computer readable memory medium according to claim 38, wherein the code for a distance calculation step calculate corresponding distances along orthogonal axes.

55. A computer readable memory medium according to claim 38, wherein said code for the arranging step arranges the features in histograms wherein the histograms are representative of the features over the entire piece of music.

* * * * *

UNITED STATES PATENT AND TRADEMARK OFFICE
CERTIFICATE OF CORRECTION

PATENT NO. : 6,201,176 B1
DATED : March 13, 2001
INVENTOR(S) : Zhenya Yourlo

It is certified that error appears in the above-identified patent and that said Letters Patent is hereby corrected as shown below:

Column 2,
Line 51, "(Cluts et al)" should read -- (Cluts) --; and
Line 64, "ct al" should read -- et al. --.

Column 5,
Line 43, "music, 100" should read -- music 100, --.

Column 8,
Line 16, "oO" should read -- of --.

Column 10,
Line 6, "(refer" should read -- (refer to --.

Column 11,
Line 39, "goal;" should read -- goal, --.

Column 13,
Line 16, "104"" should read -- 104 --;
Line 17, "similar to" should read -- "similar to --; and
Line 36, "$\sqrt{0.7^{2+0.3352^2}} = 0.776$" should read -- $\sqrt{0.7^2 + 0.335^2} = 0.766$ --.

Column 14,
Line 26, "$\sqrt{0.22^{2+0.46^2}} = 0.51$" should read -- $\sqrt{0.22^2 + 0.46^2} = 0.5$ --;

Line 39, "verysimilar" should read -- very similar --.

Column 15,
Line 12, "mean:" should read --mean: $\mu_k = \sum_{\text{all } x} (x - \bar{x})^k \cdot f(x)$ --; and Line 17, "i.e. the "dominant"" should read -- i.e., the "dominant") --.

UNITED STATES PATENT AND TRADEMARK OFFICE
CERTIFICATE OF CORRECTION

PATENT NO. : 6,201,176 B1
DATED : March 13, 2001
INVENTOR(S) : Zhenya Yourlo

It is certified that error appears in the above-identified patent and that said Letters Patent is hereby corrected as shown below:

<u>Column 22,</u>
Line 11, "spaning" should read -- spanning --; and
Line 54, "calculate" should read -- calculates --.

Signed and Sealed this

Twelfth Day of March, 2002

Attest:

JAMES E. ROGAN
*Attesting Officer*   *Director of the United States Patent and Trademark Office*